US012050724B2

(12) United States Patent
Shanware

(10) Patent No.: US 12,050,724 B2
(45) Date of Patent: *Jul. 30, 2024

(54) METHODS AND SYSTEMS FOR DISPLAYING ADDITIONAL CONTENT ON A HEADS UP DISPLAY DISPLAYING A VIRTUAL REALITY ENVIRONMENT

(71) Applicant: Rovi Guides, Inc., San Jose, CA (US)

(72) Inventor: Ajit Shanware, Cupertino, CA (US)

(73) Assignee: Rovi Guides, Inc., San Jose, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/736,393

(22) Filed: May 4, 2022

(65) Prior Publication Data

US 2023/0008596 A1 Jan. 12, 2023

Related U.S. Application Data

(63) Continuation of application No. 16/872,774, filed on May 12, 2020, now Pat. No. 11,353,949, which is a
(Continued)

(51) Int. Cl.
*G06F 3/01* (2006.01)
*G02B 27/01* (2006.01)
(Continued)

(52) U.S. Cl.
CPC ............. *G06F 3/011* (2013.01); *G02B 27/01* (2013.01); *G02B 27/017* (2013.01); *G06F 3/017* (2013.01);
(Continued)

(58) Field of Classification Search
CPC .......... G06F 3/011; G06F 3/013; G06F 3/017; G06F 3/0346; G06F 3/165;
(Continued)

(56) References Cited

U.S. PATENT DOCUMENTS 6,239,794 B1 5/2001 Yuen et al.
6,388,714 B1 5/2002 Schein et al.
(Continued)

FOREIGN PATENT DOCUMENTS

EP 1301021 A2 4/2003
EP 2453290 A1 5/2012
(Continued)

OTHER PUBLICATIONS

Penkar et al., "Eyes Only: Navigating Hypertext with Gaze," Department of Computer Science, University of Auckland, IFIP Int'l Federation for Information Processing, pp. 153-169 (2013).
(Continued)

*Primary Examiner* — Wesner Sajous
(74) *Attorney, Agent, or Firm* — Haley Guiliano LLP

(57) ABSTRACT

Methods and systems for enabling a user to perform a full body movement while viewing a virtual reality environment on a head up displays without interfering with viewing of content on the heads up display. Specifically, a full body movement of the user is detected. In response to detecting the full body movement, the additional content is generated for display in a portion of the virtual reality environment corresponding to a foreground area of the user's visual field. The additional content assists the user perform the full body movement.

20 Claims, 13 Drawing Sheets

Related U.S. Application Data continuation of application No. 16/009,782, filed on Jun. 15, 2018, now Pat. No. 10,691,199, which is a continuation of application No. 15/140,272, filed on Apr. 27, 2016, now Pat. No. 10,025,376.

(51) Int. Cl.
| | |
|---|---|
| *G06F 3/0346* | (2013.01) |
| *G06F 3/043* | (2006.01) |
| *G06T 13/40* | (2011.01) |
| *G06T 19/00* | (2011.01) |
| *H04N 5/45* | (2011.01) |

(52) U.S. Cl.
CPC .... *G06F 3/0346* (2013.01); *G02B 2027/0118* (2013.01); *G02B 2027/0138* (2013.01); *G02B 2027/014* (2013.01); *G02B 2027/0187* (2013.01)

(58) Field of Classification Search
CPC ... G06F 3/04815; H04L 67/131; G02B 27/01; G02B 27/017; G02B 2027/014; G02B 2027/0118; G02B 2027/0138; G10L 25/54; H04N 21/4788; H04N 21/472; H04N 21/482; H04N 21/812; H04N 21/4823; H04N 21/4668; H04N 21/4722; H04N 21/47205; H04N 21/816; H04N 21/4524; H04N 5/45; H04N 5/445; G06T 13/40; G06T 7/73; G06T 19/003; G06T 15/205; G06T 11/60; G06T 3/60; G06T 19/20; G06Q 30/0251; G06Q 30/0276; G06Q 30/0269; G06V 20/20; G06V 40/18; G06V 40/171

See application file for complete search history.

(56) References Cited

U.S. PATENT DOCUMENTS

| | | | |
|---|---|---|---|
| 6,564,378 | B1 | 5/2003 | Satterfield et al. |
| 6,756,997 | B1 | 6/2004 | Ward et al. |
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 8,947,323 | B1 | 2/2015 | Raffle et al. |
| 9,599,818 | B2 * | 3/2017 | Yamagishi ............... A63F 13/26 |
| 9,851,792 | B2 | 12/2017 | Shanware |
| 10,025,376 | B2 * | 7/2018 | Shanware ............... G02B 27/01 |
| 10,158,917 | B1 * | 12/2018 | Logan ................ H04N 21/4788 |
| 10,535,190 | B2 * | 1/2020 | Logan ................ H04N 21/6587 |
| 10,691,199 | B2 * | 6/2020 | Shanware ............... G06F 3/011 |
| 2002/0174430 | A1 | 11/2002 | Ellis et al. |
| 2003/0110499 | A1 | 6/2003 | Knudson et al. |
| 2005/0251827 | A1 | 11/2005 | Ellis et al. |
| 2010/0153885 | A1 | 6/2010 | Yates |
| 2011/0043644 | A1 | 2/2011 | Munger et al. |
| 2012/0068913 | A1 | 3/2012 | Bar-Zeev et al. |
| 2012/0127284 | A1 | 5/2012 | Bar-Zeev et al. |
| 2013/0293530 | A1 | 11/2013 | Perez et al. |
| 2013/0336629 | A1 | 12/2013 | Mulholland et al. |
| 2014/0063061 | A1 | 3/2014 | Reitan |
| 2014/0198017 | A1 | 7/2014 | Lamb et al. |
| 2014/0361977 | A1 | 12/2014 | Stafford et al. |
| 2014/0364212 | A1 * | 12/2014 | Osman .................. A63F 13/537 463/31 |
| 2014/0372957 | A1 | 12/2014 | Keane et al. |
| 2015/0007114 | A1 | 1/2015 | Poulos et al. |
| 2015/0015608 | A1 | 1/2015 | Park |
| 2015/0094142 | A1 | 4/2015 | Stafford |
| 2015/0212576 | A1 * | 7/2015 | Ambrus ................ G06F 3/0482 345/156 |
| 2015/0309316 | A1 | 10/2015 | Osterhout et al. |
| 2016/0025971 | A1 | 1/2016 | Crow et al. |
| 2016/0041388 | A1 | 2/2016 | Fujimaki et al. |
| 2016/0054795 | A1 * | 2/2016 | Sasaki ..................... G06F 3/013 345/642 |
| 2016/0133055 | A1 | 5/2016 | Fateh |
| 2016/0214015 | A1 * | 7/2016 | Osman .................... A63F 13/00 |
| 2016/0266386 | A1 | 9/2016 | Scott et al. |
| 2016/0282618 | A1 | 9/2016 | Kon et al. |
| 2016/0379413 | A1 | 12/2016 | Yamamoto et al. |
| 2017/0160546 | A1 | 6/2017 | Bull et al. |
| 2017/0168566 | A1 | 6/2017 | Osterhout et al. |
| 2017/0287215 | A1 | 10/2017 | Lalonde et al. |
| 2018/0299949 | A1 | 10/2018 | Shanware |

FOREIGN PATENT DOCUMENTS

| | | | |
|---|---|---|---|
| EP | 2887318 | A4 | 4/2016 |
| GB | 2524269 | A | 9/2015 |
| JP | 2005303843 | A | 10/2005 |
| JP | 2012035784 | A | 2/2012 |
| JP | 2012205191 | A | 10/2012 |
| JP | 2013225311 | A | 10/2013 |
| JP | 2014038527 | A | 2/2014 |
| JP | 2014513367 | A | 5/2014 |
| JP | 2014132305 | A | 7/2014 |
| JP | 2014137396 | A | 7/2014 |
| JP | 2014164537 | A | 9/2014 |
| JP | 2014197337 | A | 10/2014 |
| JP | 2015011666 | A | 1/2015 |
| JP | 2015049883 | A | 3/2015 |
| JP | 2015069362 | A | 4/2015 |
| JP | 2015072415 | A | 4/2015 |
| JP | 2015118332 | A | 6/2015 |
| JP | 2015519673 | A | 7/2015 |
| JP | 2015232783 | A | 12/2015 |
| JP | 2016039599 | A | 3/2016 |
| JP | 2016509705 | A | 3/2016 |
| KR | 20150008733 | A | 1/2015 |
| KR | 20150123226 | A | 11/2015 |
| KR | 20160020571 | A | 2/2016 |
| WO | 2013191846 | A1 | 12/2013 |
| WO | 2014192103 | A1 | 12/2014 |
| WO | 2014197337 | A1 | 12/2014 |
| WO | 2015111283 | A1 | 7/2015 |
| WO | 2015163874 | A1 | 10/2015 |

OTHER PUBLICATIONS

"European Search Report of EP Application No. 19 21 1666 dated Mar. 16, 2020", European Search Report of EP Application No. 19 21 1666 dated Mar. 16, 2020.

"Extended EP Search Report of EP 18179115.3 dated Feb. 12, 2019", Extended EP Search Report of EP 18179115.3 dated Feb. 12, 2019.

"Getting your real keyboard into virtual reality", Getting your real keyboard into virtual reality, https://www.reddit.com/r/oculus/comments/2fjddc/getting_your_real_keyboard_into_virtual_reality, accessed date Mar. 3, 2016.

"Phase Between the Real and Virtual World", Phase Between the Real and Virtual World with Leap Motion and a Swipe of Your Hand, http://www.roadtovr.com/phase-real-virtual-world-leap-motion-swipe-hand, accessed date Mar. 3, 2016.

"Picture-in-Picture Camera Passthrough,", Picture-in-Picture Camera Passthrough, https://www.reddit.com/r/oculus/comments/2sciwb/passthrough_window_in_gear_vr_games, accessed date Mar. 3, 2016.

"Samsung Gear VR Camera Passthrough Demo", Samsung Gear VR Camera Passthrough Demo, https://www.youtube.com/watch?v=WZbZ_3QqO8k, accessed date Mar. 3, 2016.

"Two Possible Paths into the Future of Wearable Computing:", Two Possible Paths into the Future of Wearable Computing:, http://blogs.valvesoftware.com/abrash/two-possible-paths-into-the-future-of-wearable-computing-part-2-ar, accessed date Mar. 3, 2016.

* cited by examiner

1400

1400 ...

1401 Initialization Subroutine

1402 ...

1403 ...

1404 ...

1405 Receive instances of location on heads up display corresponding to foreground area of visual field of user

1406 ...

1407 Store values describing location on heads up display corresponding to foreground area of visual field of user 1408 Store values describing location of additional content on heads up display 1409 Compare values describing location on heads up display corresponding to foreground area of visual field of user to values describing location of additional content on heads up display 1410 If (location of the additional content on the heads up display is within the location on the heads up display corresponding to a foreground area of the visual field of the user)

Change location of additional content on heads up display

1411 ...

1412 Termination subroutine

FIG. 16

METHODS AND SYSTEMS FOR DISPLAYING ADDITIONAL CONTENT ON A HEADS UP DISPLAY DISPLAYING A VIRTUAL REALITY ENVIRONMENT

CROSS-REFERENCE TO RELATED APPLICATION

This application is a continuation of U.S. patent application Ser. No. 16/872,774, filed May 12, 2020, which is a continuation of U.S. patent application Ser. No. 16/009,782, filed Jun. 15, 2018, now U.S. Pat. No. 10,691,199, which is a continuation of U.S. patent application Ser. No. 15/140,272, now U.S. Pat. No. 10,025,376, the disclosures of which are incorporated by reference in their entireties.

BACKGROUND

In conventional systems, it may be desirable to display additional content (e.g., stock price information, sports score information, news information, weather information, a clock, a schedule of events) in addition to main content (e.g., a movie, a television show, a video game, a virtual reality world, a media guidance screen) on a display. Unfortunately, displaying additional content runs the risk that the additional content obscures or otherwise interferes with the display of the main content. This problem may be especially relevant in virtual reality environments, where systems put an emphasis on an immersive experience.

SUMMARY

Accordingly, methods and systems are described herein that re-position additional information (e.g., stock price information, sports score information, news information, weather information, a clock, a schedule of events) around the main content (e.g., a movie, a television show, a video game, a virtual reality world, a media guidance screen) based on the needs of a user in a virtual reality environment. For example, control circuitry as described herein may limit the additional information to a peripheral area of the visual field of the user, and may only re-position the additional information in response to determining that the user wishes to leave his or her immersion in the virtual reality environment. Specifically, the control circuitry determines a visual field of the user based on the movement of the center of gaze. If the control circuitry determines that the portion of the virtual reality environment in which the additional content is generated for display corresponds to a foreground area of the user's visual field, the control circuitry generates for display the additional content in a portion of the virtual reality environment corresponding to a peripheral area of the user's visual field. By ensuring that the control circuitry generates for display the additional content in a portion of the virtual reality environment that corresponds to a peripheral area of the visual field of the user, it is possible to ensure that the additional content does not interfere with the user's viewing of main content corresponding to foreground areas of the visual field of the user.

Specifically, in response to detecting a full body movement, the control circuitry generates for display the additional content in a portion of the virtual reality environment corresponding to a foreground area of the user's visual field. The additional content assists the user to perform the full body movement. By generating for display the additional content in a portion of the virtual reality environment that corresponds to a foreground area of the user's visual field, it is possible to ensure that the user can easily see the additional content. The additional content is configured to assist the user in performing the full body movement without interfering with the user's viewing of main content on the heads up display. For example, if the user is walking, the additional content may be a video of the physical surroundings of the user that can assist the user in, for example, avoiding obstacles in the physical surroundings without needing to stop viewing content on the heads up display. Thus, generating for display the additional content in the foreground area enables the user to perform the full body movement without interfering with the user's viewing of content on the heads up display.

In some aspects, methods and systems are provided herein for presenting additional content in virtual reality environments on heads up displays showing main content without interfering with a user's viewing of the main content.

The main content may be any content that is intended to be the object of a user's main focus. For example, the main content may be a media asset, such as a movie, a television show, a video game, or a virtual reality world. As another example, the main content may be a media guidance screen.

The additional content may be any content that is not main content. The additional content may be unrelated to the main content or related to the main content. For example, the additional content may be a video of the user's physical surroundings, stock price information, sports score information, news information, weather information, a clock, or a schedule of events.

The virtual reality environment may be any non-physical content displayed to a user in such a way that the non-physical content appears to the user to have a semblance of physicality. For example, the virtual reality environment may be a virtual world (for example, a virtual world in a game) which appears to the user to be the world in which the user is located. As another example, the virtual reality environment may be non-physical content that appears to the user to be superimposed on the physical world. For example, the virtual reality environment may be a speedometer display (or any other display) that is superimposed on what the user sees through the windshield of his or her car (or any other transparent surface). As another example, the virtual reality environment may be a media asset (for example, a television show or a movie) presented to the user such that the display of the media asset fully encompasses the visual field of the user.

The heads up display may be any display capable of displaying non-physical content to a user in such a way that the non-physical content appears to the user to have a semblance of physicality. For example, the heads up display may be a head-mounted display that fully covers the eyes of the user. The head-mounted display may be configured as eyeglasses, binoculars, a helmet, etc. As another example, the heads up display may be a display (for example, a display integrated with a windshield or eyeglasses) that superimposes non-physical content on a view of the physical world which the user can see through the heads up display. As another example, the heads up display may be a room in which the user is located, where the walls of the room are covered in display screens.

The methods and systems include control circuitry configured to generate for display, in a first portion of a virtual reality environment in a heads up display, first main content, wherein the first portion corresponds to a foreground area of a first visual field of a user.

The control circuitry may be based on any suitable processing circuitry, such as circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. The processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The first main content may be any portion of main content. The first main content may be a subset of the main content. For example, the first main content may be one or more objects or characters in a media asset. As another example, the first main content may be a particular area within a virtual world. As another example, the first main content may be a specific portion of a media guidance screen.

The first portion of the virtual reality environment may be any portion of the virtual reality environment. The first portion may be a subset of the virtual reality environment. The first portion may be a top, bottom, right, or left portion of the virtual reality environment. The first portion may be approximately a majority or approximately a minority of the virtual reality environment.

A visual field of the user may be anything that a user can see when the user is in a specific position. For example, the visual field may be determined based on movements of the user's head. As another example, the visual field may be determined based on movements of the user's center of gaze. For example, the visual field of the user may encompass areas within a first number of degrees to the right and left of the user's center of gaze, a second number of degrees above the center of gaze, and a third number of degrees below the center of gaze. For example, the first number of degrees may be equal to or greater than 95 degrees, for example, 95 degrees, 100 degrees, 105 degrees, 110 degrees, 115 degrees, 120 degrees, >120 degrees, or any suitable number of degrees. Alternatively, the first number of degrees may be less than 95 degrees, for example, 90 degrees, 85 degrees, 80 degrees, 75 degrees, 70 degrees, <70 degrees, or any suitable number of degrees. For example, the second number of degrees may be equal to or greater than 60 degrees, for example, 65 degrees, 70 degrees, 75 degrees, 80 degrees, 85 degrees, >85 degrees, or any suitable number of degrees. Alternatively, the second number of degrees may be less than 60 degrees, for example, 55 degrees, 50 degrees, 45 degrees, 40 degrees, <40 degrees, or any suitable number of degrees. For example, the third number of degrees may be equal to or greater than 70 degrees, for example, 75 degrees, 80 degrees, 85 degrees, 90 degrees, >90 degrees, or any suitable number of degrees. Alternatively, the third number of degrees may be less than 70 degrees, for example, 65 degrees, 60 degrees, 55 degrees, <55 degrees, or any suitable number of degrees. The visual field may be the portions of a screen of a head-mounted display that the user can see. The visual field may vary from user to user and may depend on visual impairments specific to each user.

A foreground area of a user's visual field may be any portion of the user's visual field that the user can see with normal vision. The foreground area may encompass a subset of the visual field. The foreground area may encompass areas of the visual field that are substantially in the center of the user's visual field. The foreground area may be determined based on movements of the user's head. As another example, the foreground area may be determined based on movements of the user's center of gaze. For example, the foreground area may be within a fourth number of degrees to the right and left of the center of gaze of the user, a fifth number of degrees above the center of gaze of the user, and a sixth number of degrees below the center of gaze of the user. For example, the fourth, fifth, and sixth numbers of degrees may be equal to or greater than 18 degrees, for example, 20 degrees, 25 degrees, 30 degrees, 35 degrees, >35 degrees, or any suitable number of degrees. Alternatively, the fourth, fifth, and sixth numbers of degrees may be less than 18 degrees, for example, 15 degrees, 10 degrees, 5 degrees, <5 degrees, or any suitable number of degrees. The fourth, fifth, and sixth numbers of degrees may be different. The foreground area may be the portions of a screen of a head-mounted display that the user can see with main vision. The foreground area may vary from user to user and may depend on visual impairments specific to each user.

The control circuitry is further configured to generate for display, in a second portion of the virtual reality environment in the heads up display, second main content and additional content, wherein the second portion corresponds to a peripheral area of the first visual field of the user.

The second portion of the virtual reality environment may be any portion of the virtual reality environment. The second portion may be a subset of the virtual reality environment. The second portion may be different than the first portion. The second portion may be a top, bottom, right, or left portion of the virtual reality environment. The second portion may be near or at the boundary or corner of the virtual reality environment. The second portion may be approximately a majority or approximately a minority of the virtual reality environment.

The second main content may be any portion of main content. The second main content may be a subset of the main content. For example, the second main content may be one or more objects or characters in a media asset. As another example, the second main content may be a particular area within a virtual world. As another example, the second main content may be a specific portion of a media guidance screen.

A peripheral area of a user's visual field may be any portion of a user's visual field that the user can see with peripheral vision. The peripheral area may be areas that are substantially at the edges of the user's visual field. The peripheral area may be determined based on movements of the user's head. As another example, the peripheral field may be determined based on movements of the user's center of gaze. For example, the peripheral area may be any portion of the visual field that is not foreground area. For example, the peripheral area may encompass areas of the visual field within a certain number of degrees of the outer boundary of the visual field. The peripheral area may be the portions of a screen of a head-mounted display that the user can see with peripheral vision. The peripheral area may vary from user to user and may depend on visual impairments specific to each user.

The control circuitry is further configured to determine a second visual field of the user based on a movement of a center of gaze of the user. For example, the control circuitry may determine the second visual field by determining the new center of gaze. For example, the control circuitry may determine the second visual field by detecting a movement of the head of the user.

The control circuitry is further configured to determine that the second portion corresponds to a foreground area of the second visual field. For example, the second portion may correspond to a corner of the first visual field but correspond to the center of the second visual field.

The control circuitry is further configured, in response to determining that the second portion corresponds to the foreground area of the second visual field, to generate for display the additional content in a third portion of the virtual reality environment, wherein the third portion corresponds to a peripheral area of the second visual field.

The third portion of the virtual reality environment may be any portion of the virtual reality environment. The third portion may be a subset of the virtual reality environment. The third portion may be different than the first and second portions. The third portion may be a top, bottom, right, or left portion of the virtual reality environment. The third portion may be near or at the boundary or corner of the virtual reality environment. The third portion may be approximately a majority or approximately a minority of the virtual reality environment.

The methods and systems further include a detection module configured to detect the movement of the center of gaze of the user. For example, the detection module may detect the movement of the center of gaze by detecting a gaze point of each eye of the user using light. For example, the detection module may detect the movement of the center of gaze by detecting a movement of the head of the user. For example, the detection module may detect the movement of the center of gaze by detecting a change in a video of the physical surroundings of the user with captured with a camera physically coupled to the user. The center of gaze may be any area of the user's visual field to which the gaze of the user is substantially focused. The center of gaze may be a central portion of what a user can see. The center of gaze may be a midpoint between the gaze point of each eye of the user. In users with a visual impairment in one eye, the center of gaze may be the gaze point of the unimpaired eye.

In some embodiments, the detection module is further configured to detect the movement of the center of gaze by detecting the center of gaze of the user. In certain embodiments, the detection module is further configured, when detecting the center of gaze of the user, to transmit light to each eye of the user; collect an image of each eye of the user; detect, in each image, a location of a reflection in an eye of the user; determine a location of each pupil of the user; compare the location of each pupil to the location of each reflection; based on comparing the location of each pupil to the location of each reflection, determine a gaze point of each eye of the user; and determine the center of gaze by determining a midpoint between the gaze point of each eye of the user.

In certain embodiments, the heads up display is a head-mounted display physically coupled to the head of the user, the head-mounted display includes an accelerometer, and the detection module is further configured, when detecting the movement of the center of gaze of the user, to detect, by the accelerometer, an acceleration of the head of the user.

In some embodiments, the heads up display is a head-mounted display physically coupled to the head of the user, the head-mounted display includes a camera feeding a video of the user's physical surroundings to the display, and the control circuitry is further configured, when generating for display the additional content, to generate for display the video of the user's physical surroundings.

In certain embodiments, the control circuitry is further configured, when generating for display the additional content, to generate for display the additional content as a picture-in-picture.

In some embodiments, the control circuitry is further configured, when determining the second visual field of the user based on the movement of the center of gaze, to determine a new center of gaze based on the movement of the center of gaze and to determine an area that is within a first number of degrees to the right and left of the new center of gaze, a second number of degrees above the new center of gaze, and a third number of degrees below the new center of gaze.

In certain embodiments, the control circuitry is further configured, when determining that the second portion corresponds to the foreground area of the second visual field, to determine the foreground area of the second visual field, and the control circuitry is further configured, when determining the foreground area of the second visual field, to determine an area that is within a fourth number of degrees to the right and left of the new center of gaze, a fifth number of degrees above the new center of gaze, and a sixth number of degrees below the new center of gaze, wherein the fourth number is smaller than the first number, the fifth number is smaller than the second number, and the sixth number is smaller than the third number.

In some embodiments, the systems and methods further include a user interface configured to receive an input from the user, and the control circuitry is further configured, in response to the input, to generate for display the additional content in a portion of the virtual reality environment corresponding to a foreground area of the second visual field.

In certain embodiments, the control circuitry is further configured, when generating for display the additional content, to measure a time period after the movement of the center of gaze of the user during which the center of the gaze of the user has not substantially moved; determine that the time period is greater than a threshold time period; and in response to determining that the time period is greater than the threshold time period, generate for display the additional content.

In some aspects, methods and systems are provided herein for enabling users to perform full body movements while viewing virtual reality environments on heads up displays without interfering with viewing of content on the heads up displays.

The virtual reality environment may be any non-physical content displayed to a user in such a way that the non-physical content appears to the user to have a semblance of physicality. For example, the virtual reality environment may be a virtual world (for example, a virtual world in a game) which appears to the user to be the world in which user is located. As another example, the virtual reality environment may be non-physical content that appears to the user to be superimposed on the physical world. For example, the virtual reality environment may be a speedometer display (or any other display) that is superimposed on what user sees through the windshield of his or her car (or any other transparent surface). As another example, the virtual reality environment may be a media asset (for example, a television show or a movie) presented to the user such that the display of the media asset fully encompasses the visual field of the user.

The heads up display may be any display capable of displaying non-physical content to a user in such a way that the non-physical content appears to the user to have a semblance of physicality. For example, the heads up display may be a head-mounted display that fully covers the eyes of the user. The head-mounted display may be configured as eyeglasses, binoculars, a helmet, etc. As another example, the heads up display may be a display (for example, a display integrated with a windshield or eyeglasses) that superimposes non-physical content on a view of the physical world which the user can see through the heads up display. As another example, the heads up display may be a room in which the user is located, where the walls of the room are covered in display screens.

The full body movement may be any physical movement by a user that requires movement of a substantial portion of the user's entire body. For example, the full body movement may be walking, jumping, standing up, sitting down, rotating one's body, etc.

The systems and method include control circuitry configured to generate for display, in a first portion of a virtual reality environment in a heads up display, main content, wherein the first portion corresponds to a foreground area of a visual field of a user.

The control circuitry may be based on any suitable processing circuitry, such as circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. The processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The first portion of the virtual reality environment may be any portion of the virtual reality environment. The first portion may be a subset of the virtual reality environment. The first portion may be a top, bottom, right, or left portion of the virtual reality environment. The first portion may be approximately a majority or approximately a minority of the virtual reality environment.

The main content may be content that is intended to be the object of a user's main focus. For example, the main content may be a media asset, such as a movie, a television show, a video game, or a virtual reality world. As another example, the main content may be a media guidance screen.

A visual field of the user may be anything that a user can see when the user is in a specific position. For example, the visual field may be determined based on movements of the user's head. As another example, the visual field may be determined based on movements of the user's center of gaze. For example, the visual field of the user may encompass areas within a first number of degrees to the right and left of the user's center of gaze, a second number of degrees above the center of gaze, and a third number of degrees below the center of gaze. For example, the first number of degrees may be equal to or greater than 95 degrees, for example, 95 degrees, 100 degrees, 105 degrees, 110 degrees, 115 degrees, 120 degrees, >120 degrees, or any suitable number of degrees. Alternatively, the first number of degrees may be less than 95 degrees, for example, 90 degrees, 85 degrees, 80 degrees, 75 degrees, 70 degrees, <70 degrees, or any suitable number of degrees. For example, the second number of degrees may be equal to or greater than 60 degrees, for example, 65 degrees, 70 degrees, 75 degrees, 80 degrees, 85 degrees, >85 degrees, or any suitable number of degrees. Alternatively, the second number of degrees may be less than 60 degrees, for example, 55 degrees, 50 degrees, 45 degrees, 40 degrees, <40 degrees, or any suitable number of degrees. For example, the third number of degrees may be equal to or greater than 70 degrees, for example, 75 degrees, 80 degrees, 85 degrees, 90 degrees, >90 degrees, or any suitable number of degrees. Alternatively, the third number of degrees may be less than 70 degrees, for example, 65 degrees, 60 degrees, 55 degrees, <55 degrees, or any suitable number of degrees. The visual field may be the portions of a screen of a head-mounted display that the user can see. The visual field may vary from user to user and may depend on visual impairments specific to each user.

A foreground area of a user's visual field may be any portion of the user's visual field that the user can see with normal vision. The foreground area may encompass a subset of the visual field. The foreground area may encompass areas of the visual field that are substantially in the center of the user's visual field. The foreground area may be determined based on movements of the user's head. As another example, the foreground area may be determined based on movements of the user's center of gaze. For example, the foreground area may be within a fourth number of degrees to the right and left of the center of gaze of the user, a fifth number of degrees above the center of gaze of the user, and a sixth number of degrees below the center of gaze of the user. For example, the fourth, fifth, and sixth numbers of degrees may be equal to or greater than 18 degrees, for example, 20 degrees, 25 degrees, 30 degrees, 35 degrees, >35 degrees, or any suitable number of degrees. Alternatively, the fourth, fifth, and sixth numbers of degrees may be less than 18 degrees, for example, 15 degrees, 10 degrees, 5 degrees, <5 degrees, or any suitable number of degrees. The foreground area may be the portions of a screen of a head-mounted display that the user can see with main vision. The foreground area may vary from user to user and may depend on visual impairments specific to each user.

The control circuitry is further configured to generate for display, in a second portion of the virtual reality environment in the heads up display, additional content, wherein the second portion corresponds to a peripheral area of the visual field of the user.

The second portion of the virtual reality environment may be any portion of the virtual reality environment. The second portion may be a subset of the virtual reality environment. The second portion may be different than the first portion. The second portion may be a top, bottom, right, or left portion of the virtual reality environment. The second portion may be near or at the boundary or corner of the virtual reality environment. The second portion may be approximately a majority or approximately a minority of the virtual reality environment.

The additional content assists the user to perform the full body movement. For example, the additional content may be a video of the user's physical surroundings. As another example, the additional content may be a map of the user's physical surroundings.

A peripheral area of a user's visual field may be any portion of a user's visual field that the user can see with peripheral vision. The peripheral area may be areas that are substantially at the edges of the user's visual field. The peripheral area may be determined based on movements of the user's head. As another example, the peripheral field may be determined based on movements of the user's center of gaze. For example, the peripheral area may be any portion of the visual field that is not foreground area. For example, the peripheral area may encompass areas of the visual field within a certain number of degrees of the outer boundary of the visual field. The peripheral area may be the portions of a screen of a head-mounted display that the user can see with peripheral vision. The peripheral area may vary from user to user and may depend on visual impairments specific to each user.

The control circuitry is further configured, in response to detecting a full body movement of the user, to generate for display the additional content in the first portion of the virtual reality environment. The systems and methods further include a detection module configured to detect the full body movement of the user. For example, the detection module may detect the full body movement by detecting an acceleration of a portion of the body of the user. For example, the detection module may detect a footstep. As another example, the detection module may detect the full body movement by detecting a change in a video of the physical surroundings of the user captured with a camera physically coupled to the user.

In some embodiments, the heads up display is a head-mounted display physically coupled to the head of the user, the head-mounted display includes a camera feeding a video of the user's physical surroundings to the display, and the control circuitry is further configured, when generating for display the additional content, to generate for display the video of the user's physical surroundings.

In certain embodiments, the control circuitry is further configured, when generating for display the additional content, to generate for display the additional content as a picture-in-picture.

In some embodiments, the heads up display is a head-mounted display physically coupled to the head of the user, the detection module includes an accelerometer included in the head-mounted display, and the detection module is further configured, when detecting the full body movement of the user, to detect, using the accelerometer, a first footstep taken by the user.

In certain embodiments, the detection module is further configured to detect, using the accelerometer, a second footstep taken by the user, and the control circuitry is further configured, in response to the detecting of the second footstep, to enlarge the additional content.

In some embodiments, the detection module is further configured to detect, using the accelerometer, a second footstep taken by the user, and the control circuitry is further configured, in response to the detecting of the second footstep, to perform at least one of decreasing an opacity of the main content and increasing an opacity of the additional content.

In certain embodiments, a user interface is configured to receive an input from the user, and the control circuitry is further configured, in response to the input, to remove the additional content from the heads up display.

In some embodiments, the detection module is further configured, when detecting the full body movement of the user, to detect a change in the video of the user's physical surroundings.

In certain embodiments, the detection module is further configured to detect that the user is substantially stationary, and the control circuitry is further configured, in response to the detecting that the user is substantially stationary, to generate for display the additional content in a third portion of the display.

In some embodiments, a user interface is configured to present an option to the user to stop playback of the main content.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 16 describes a process to present additional content in virtual reality environments on heads up displays showing main content without interfering with a user's viewing of the main content in accordance with some embodiments of the disclosure.

DETAILED DESCRIPTION OF THE DRAWINGS

Figure 1:
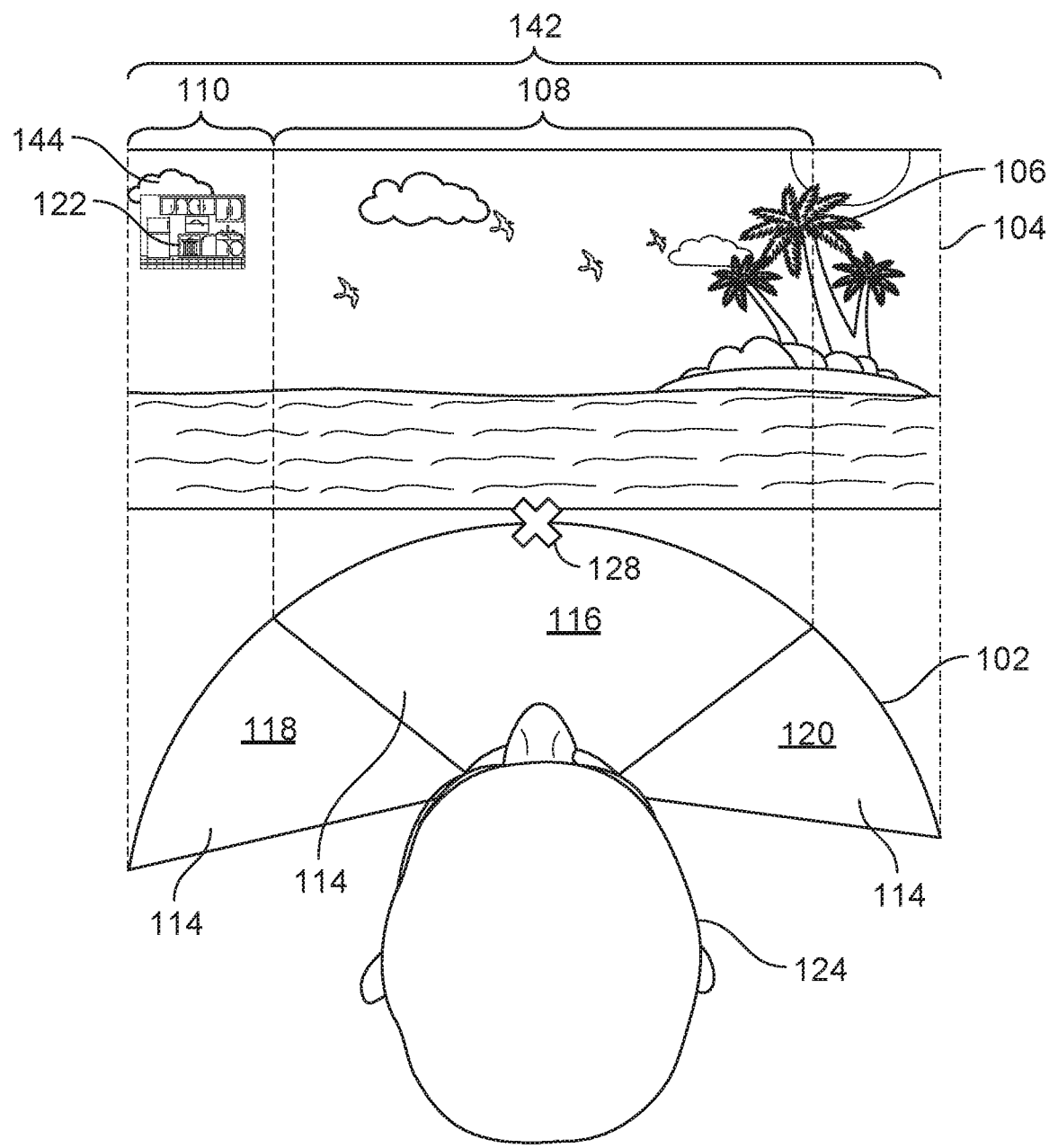
FIGS. 1-2 show an illustrative example of presenting additional content in virtual reality environments on heads up displays showing main content without interfering with a user's viewing of the main content.

Methods and systems are described herein for presenting additional content in virtual reality environments on heads up displays showing main content without interfering with a user's viewing of the main content. Specifically, a movement of a center of gaze of the user is detected. A visual field of the user based on the movement of the center of gaze is determined. If it is determined that the portion of the virtual reality environment in which the additional content is generated for display corresponds to a foreground area of the user's visual field, the additional content is generated for display in a portion of the virtual reality environment corresponding to a peripheral area of the user's visual field. By ensuring that additional content is generated for display in a portion of the virtual reality environment that corresponds to a peripheral area of the visual field of the user, it is possible to ensure that the additional content does not interfere with the user's viewing of main content corresponding to foreground areas of the visual field of the user.

Additionally, methods and systems are described herein for enabling a user to perform a full body movement while viewing a virtual reality environment on a head up displays without interfering with viewing of content on the heads up display. Specifically, a full body movement of the user is detected. In response to detecting the full body movement, the additional content is generated for display in a portion of the virtual reality environment corresponding to a foreground area of the user's visual field. The additional content assists the user to perform the full body movement. By generating for display the additional content in a portion of the virtual reality environment that corresponds to a foreground area of the user's visual field, it is possible to ensure that the user can easily see the additional content. The additional content is configured to assist the user in performing the full body movement without interfering with the user's viewing of main content on the heads up display. For example, if the user is walking, the additional content may be a video of the physical surroundings of the user that can assist the user in, for example, avoiding obstacles in the physical surroundings without needing to stop viewing content on the heads up display. Thus, generating for display the additional content in the foreground area enables the user to perform the full body movement without interfering with the user's viewing of content on the heads up display.

As referred to herein, the term "virtual reality environment" should be understood to mean any non-physical content displayed to a user in such a way that the non-physical content appears to the user to have a semblance of physicality. For example, the virtual reality environment may be a virtual world (for example, a virtual world in a game) which appears to the user to be the world in which user is located. As another example, the virtual reality environment may be non-physical content that appears to the user to be superimposed on the physical world. For example, the virtual reality environment may be a speedometer display (or any other display) that is superimposed on what user sees through the windshield of his or her car (or any other transparent surface). As another example, the virtual reality environment may be a media asset (for example, a television show or a movie) presented to the user such that the display of the media asset fully encompasses the visual field of the user.

As referred to herein, the term "heads up display" should be understood to mean any display capable of displaying non-physical content to a user in such a way that the non-physical content appears to the user to have a semblance of physicality. For example, the heads up display may be a head-mounted display that fully covers the eyes of the user. The head-mounted display may be configured as eyeglasses, binoculars, a helmet, etc. As another example, the heads up display may be a display (for example, a display integrated with a windshield or eyeglasses) that superimposes non-physical content on a view of the physical world which the user can see through the heads up display. As another example, the heads up display may be a room in which the user is located, where the walls of the room are covered in display screens.

As referred to herein, the term "center of gaze" should be understood to mean a central portion of what a user can see. The center of gaze may be any area of the user's visual field to which the gaze of the user is substantially focused. The center of gaze may be a midpoint between the gaze point of each eye of the user. In users with a visual impairment in one eye, the center of gaze may be the gaze point of the unimpaired eye.

As referred to herein, the term "visual field" should be understood to mean anything that a user can see when the user is in a specific position. For example, the visual field may be determined based on movements of the user's head. As another example, the visual field may be determined based on movements of the user's center of gaze. For example, the visual field of the user may encompass areas within a first number of degrees to the right and left of the user's center of gaze, a second number of degrees above the center of gaze, and a third number of degrees below the center of gaze. For example, the first number of degrees may equal to or greater than 95 degrees, for example, 95 degrees, 100 degrees, 105 degrees, 110 degrees, 115 degrees, 120 degrees, >120 degrees, or any suitable number of degrees. Alternatively, the first number of degrees may be less than 95 degrees, for example, 90 degrees, 85 degrees, 80 degrees, 75 degrees, 70 degrees, <70 degrees, or any suitable number of degrees. For example, the second number of degrees may be equal to or greater than 60 degrees, for example, 65 degrees, 70 degrees, 75 degrees, 80 degrees, 85 degrees, >85 degrees, or any suitable number of degrees. Alternatively, the second number of degrees may be less than 60 degrees, for example, 55 degrees, 50 degrees, 45 degrees, 40 degrees, <40 degrees, or any suitable number of degrees. For example, the third number of degrees may be equal to or greater than 70 degrees, for example, 75 degrees, 80 degrees, 85 degrees, 90 degrees, >90 degrees, or any suitable number of degrees. Alternatively, the third number of degrees may be less than 70 degrees, for example, 65 degrees, 60 degrees, 55 degrees, <55 degrees, or any suitable number of degrees. The visual field may be the portions of a screen of a head-mounted display that the user can see. The visual field of the user may vary from user to user and may depend on visual impairments specific to each user.

As referred to herein, the term "foreground area" should be understood to mean any portion of the user's visual field that the user can see with normal vision. The foreground area may encompass a subset of the visual field. The foreground area may encompass areas of the visual field that are substantially in the center of the user's visual field. The foreground area may be determined based on movements of the user's head. As another example, the foreground area may be determined based on movements of the user's center of gaze. For example, the foreground area may be within a fourth number of degrees to the right and left of the center of gaze of the user, a fifth number of degrees above the center of gaze of the user, and a sixth number of degrees below the center of gaze of the user. For example, the fourth, fifth, and sixth numbers of degrees may be equal to or greater than 18 degrees, for example, 20 degrees, 25 degrees, 30 degrees, 35 degrees, >35 degrees, or any suitable number of degrees. Alternatively, the fourth, fifth, and sixth numbers of degrees may be less than 18 degrees, for example, 15 degrees, 10 degrees, 5 degrees, <5 degrees, or any suitable number of degrees. The foreground area may be the portions of a screen of a head-mounted display that the user can see with main vision. The foreground area may vary from user to user and may depend on visual impairments specific to each user.

As referred to herein, the term "peripheral area" should be understood to mean any portion of a user's visual field that the user can see with peripheral vision. The peripheral area may be areas that are substantially at the edges of the user's visual field. The peripheral area may be determined based on movements of the user's head. As another example, the peripheral field may be determined based on movements of the user's center of gaze. For example, the peripheral area may be any portion of the visual field that is not foreground area. For example, the peripheral area may encompass areas of the visual field within a certain number of degrees of the outer boundary of the visual field. The peripheral area may be the portions of a screen of a head-mounted display that the user can see with peripheral vision. The peripheral area may vary from user to user and may depend on visual impairments specific to each user.

As referred to herein, the term "main content" should be understood to mean any content that is intended to be the object of a user's main focus. For example, the main content may be a media asset, such as a movie, a television show, a video game, or a virtual reality world. As another example, the main content may be a media guidance screen.

As referred to herein, the term "additional content" should be understood to mean any content that is not main content. The additional content may be unrelated to the main content or related to the main content. For example, the additional content may be a video of the user's physical surroundings, stock price information, sports score information, news information, weather information, a clock, or a schedule of events.

As referred to herein, the term "full body movement" should be understood to mean any physical movement by a user that requires movement of a substantial portion of the user's entire body. For example, the full body movement may be walking, jumping, standing up, sitting down, rotating one's body, etc.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

In some embodiments, control circuitry 604, discussed further in relation to FIG. 8 below, executes instructions stored in memory (i.e., storage 608 discussed further in relation to FIG. 8 below). Specifically, control circuitry 604 may be instructed to perform the functions discussed above and below. For example, the instructions may cause control circuitry 604 to generate the displays as described above and below. In some implementations, any action performed by control circuitry 604 may be based on instructions.

Figure 2:
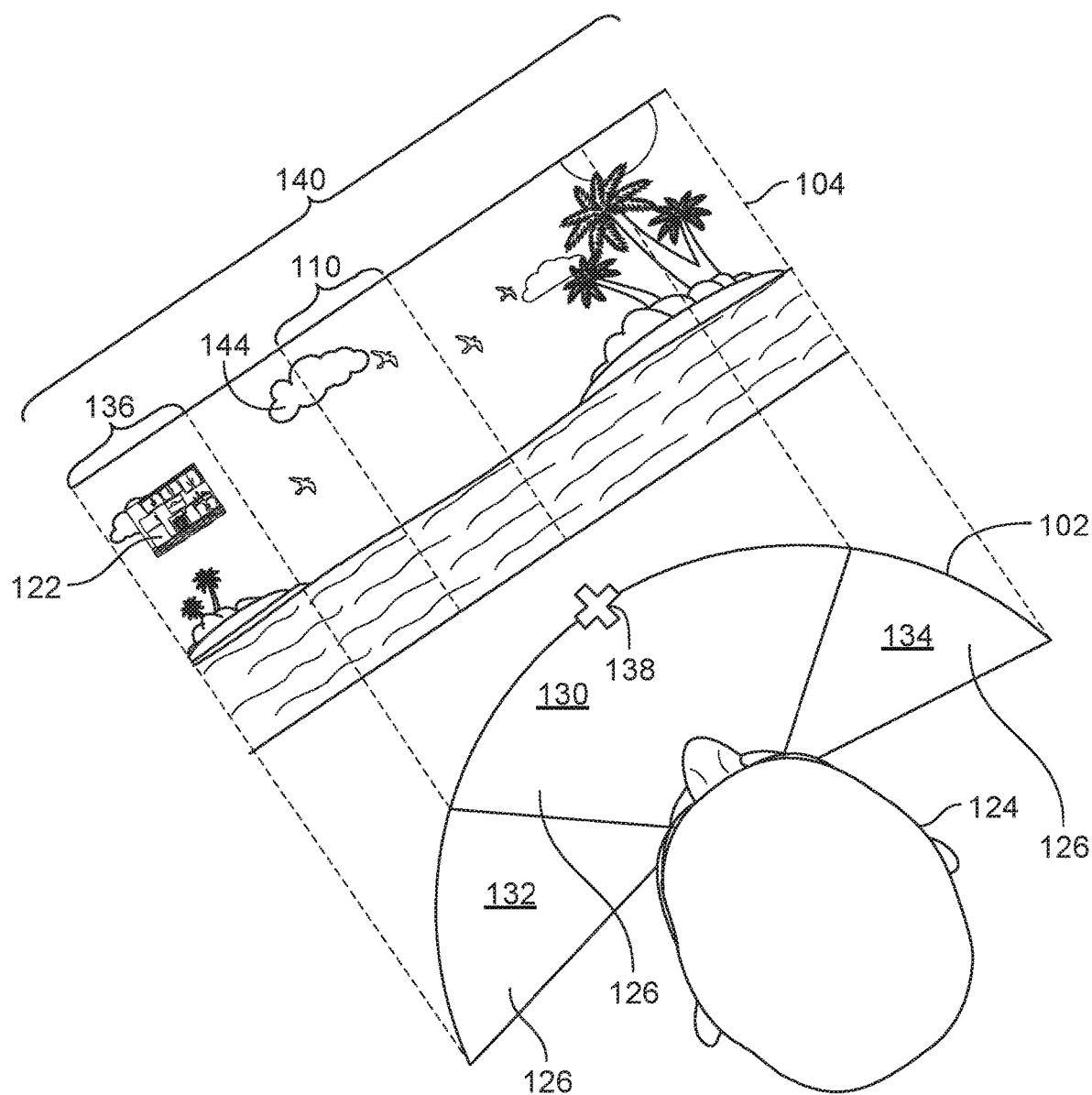

FIGS. 1-2 show an illustrative example of presenting additional content in virtual reality environments on heads up displays showing main content without interfering with a user's viewing of the main content.

Virtual reality environment 104 is any non-physical content displayed to user 124 in such a way that the non-physical content appears to user 124 to have a semblance of physicality. For example, virtual reality environment 104 may be a virtual world (for example, a virtual world in a game) which appears to user 124 to be the world in which user 124 is located. As another example, virtual reality environment 104 may be non-physical content that appears to user 124 to be superimposed on the physical world. For example, the virtual reality environment 104 may be a speedometer display that is superimposed on what user 124 sees through the windshield of his or her car. As another example, virtual reality environment 104 may be a media asset (for example, a television show or a movie) presented to user 124 such that the display of the media asset fully encompasses the visual field of user 124.

Heads up display 102 generates for display virtual reality environment 104 to user 124. Heads up display 102 may be any display capable of displaying non-physical content to user 124 in such a way that the non-physical content appears to user 124 to have a semblance of physicality. For example, heads up display 102 may be a head-mounted display that fully covers the eyes of user 124 (for example, head-mounted display 301 of FIG. 5). As another example, heads up display 102 may be a display (for example, a display integrated with a windshield or eyeglasses) that superimposes non-physical content on a view of the physical world which user 124 can see through heads up display 102. Heads up display 102 may be configured to change the content of virtual reality environment 104 shown to user 124 when user 124 moves. For example, if user 124 walks forward, the content of virtual reality environment 104 shown to user 124 may appear to the user to move closer to user 124.

User 124 has first visual field 114. First visual field 114 encompasses what user 124 can see when user 124 is in the position shown in FIG. 1. For simplicity, in FIGS. 1-4 and this description, visual fields are shown and discussed as varying in the horizontal direction, but it should be understood that visual fields also vary in the vertical direction. The center of gaze of a user is the central portion of what the user can see. In FIG. 1, the center of gaze of user 124 is at center of gaze position 128. A visual field of a user extends to the right and left of the center of gaze position a certain number of degrees (for example, 95 degrees). The visual field includes at least one foreground area and at least one peripheral area. The at least one foreground area includes the area of the visual field that the user can see with normal vision. The at least one foreground area encompasses a certain number of degrees (for example, 60 degrees) of the center of the visual field. The at least one peripheral area includes the area of the visual field that the user can see with peripheral vision. The at least one peripheral area encompasses a certain number of degrees (for example, 35 degrees) to the right and left of foreground area 116. First visual field 114 includes foreground area 116, peripheral area 118, and peripheral area 120.

In FIG. 1, heads up display 102 shows virtual reality environment portion 142 of virtual reality environment 104. Virtual reality environment portion 142 of virtual reality environment 104 includes first portion 108 and second portion 110. First portion 108 includes portions of virtual reality environment 104 corresponding to foreground area 116 of first visual field 114. Second portion 110 includes portions of virtual reality environment 104 corresponding to peripheral area 118 of first visual field 114. First main content 106 (in FIG. 1, a tree) is generated for display in first portion 108 of virtual reality environment 104. Second main content 144 (in FIGS. 1-2, a cloud) and additional content 122 (in FIGS. 1-2, a video of the user's physical surroundings) are generated for display in second portion 110.

In FIG. 2, user 124 has rotated such that the center of gaze of user 124 is at center of gaze position 138. User 124 has second visual field 126 when user 124 is in the position shown in FIG. 2. Second visual field 126 includes foreground area 130, peripheral area 132, and peripheral area 134.

In FIG. 2, heads up display 102 shows virtual reality environment portion 140 of virtual reality environment 104 to user 124. Virtual reality environment portion 140 of virtual reality environment 104 includes second portion 110 and third portion 136. Second portion 110 includes portions of virtual reality environment 104 corresponding to foreground area 130 of second visual field 126. Third portion 136 includes portions of virtual reality environment 104 corresponding to peripheral area 132 of second visual field 126.

Because user 124 has rotated to the left from FIG. 1 to FIG. 2, virtual reality environment portion 140 of virtual reality environment 104 includes portions to the left of virtual reality environment portion 142 of virtual environment 104 but also portions that are present in both virtual reality environment portion 140 and virtual reality environment portion 142. For example, second portion 110 is present both in virtual reality environment portion 140 and virtual reality environment portion 142, but third portion 136 is present in virtual reality environment portion 140 but not in virtual reality environment portion 142.

Figure 8:
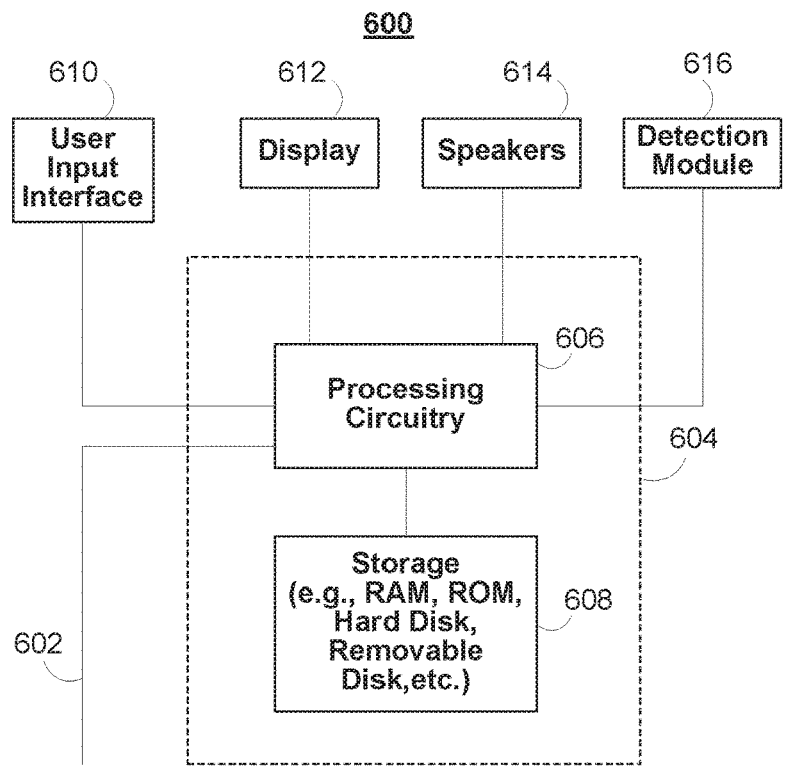
FIG. 8 is a block diagram of an illustrative user equipment device in accordance with some embodiments of the disclosure.

Movements of the center of gaze of user 124 may be detected (for example, by detection module 616 of FIG. 8). In some embodiments, detecting the movement of the center of gaze includes detecting the center of the gaze. For example, in FIGS. 1-2, the movement of the center of gaze of user 124 from center of gaze position 128 to center of gaze position 138 is detected. A visual field of user 124 based on the movement of the center of gaze of user 124 is determined. For example, in FIG. 2, the second visual field 126 is determined based on the movement of the center of gaze of user 124 from center of gaze position 128 to center of gaze position 138.

Before the movement of the center of gaze of user 124, additional content 122 was generated for display in a portion (i.e., second portion 110) of virtual reality environment 104 that corresponded to a peripheral area (i.e., peripheral area 118) of the visual field (i.e., first visual field 114) of user 124. A determination is made if the portion (i.e., second portion 110) of virtual reality environment 104 in which additional content 122 was generated for display before the movement of the center of gaze of user 124 corresponds to the foreground area (i.e., foreground area 130) of the visual field (i.e., second visual field 126) of user 124 after the movement of the center of gaze of user 124. For example, in FIG. 2, second portion 110 corresponds to foreground area 130 of second visual field 126. In response to this determination, additional content 122 is generated for display in a portion of the visual field of user 124 that corresponds to a peripheral area of the visual field (i.e., second visual field 126) of user 124. For example, in FIG. 2, additional content 122 is generated for display in third portion 136, which corresponds to peripheral area 132 of second visual field 126.

By ensuring that additional content 122 is generated for display in a portion of virtual reality environment 104 that corresponds to a peripheral area of the visual field of user 124, it is possible to ensure that additional content 122 does not interfere with the user's viewing of main content corresponding to foreground areas of the visual field of user 124. For example, in FIGS. 1-2, if additional content 122 remained generated for display in second portion 110 of virtual reality environment 104 after the movement of the center of gaze of user 124, additional content 122 would interfere with the user's viewing of second main content 144 in foreground area 130. Because additional content 122 is generated for display in third portion 136 after the movement of the center of gaze of user 124, additional content 122 does not interfere with the user's viewing of second main content 144 in foreground area 130.

First main content 106 and second main content 144 may be any type of content. In some embodiments, main content 106 provides media guidance data (as discussed in relation to FIGS. 6-7).

Additional content 122 may be any type of additional content. For example, additional content 122 may be a video of the physical surroundings of user 124, stock price information, sports score information, news information, weather information, a clock, a schedule of events, or any other type of additional content. Additional content 122 may be unrelated to main content 106.

In FIGS. 1-2, additional content 122 is generated for display as a picture-in-picture. In some embodiments, additional content 122 is generated for display as an overlay.

In some embodiments, additional content 122 is generated for display at a lower image and/or video quality (e.g., lower resolution, frame rate, etc.) than main content (e.g., first main content 106, second main content 144) shown by virtual reality environment 104. Generating for display additional content 122 at a lower image and/or video quality may help heads up display 102 conserve power, memory, bandwidth, etc. Additionally, generating for display additional content 122 at a lower image and/or video quality may not be detrimental to the user's viewing experience because user 124 may not be able to differentiate between high and low quality images and/or video viewed in peripheral areas (e.g., peripheral area 118) of the user's visual field (e.g., visual field 114).

In some embodiments, virtual reality environment 104 includes portions that show main content and portions that do not show main content. For example, a certain portion of the center of virtual reality environment 104 may show main content (e.g., first main content 106, second main content 144) while the remainder of virtual reality environment 104 does not show main content. For example, virtual reality environment 104 may show main content in a certain portion (e.g., 95%, 90%, 80%, 70%, 60%, 50%, etc.) of the center of the horizontal extent of virtual reality environment 104 but not show main content in the remainder of the horizontal extent of virtual reality environment 104. As another example, virtual reality environment 104 may show main content in a certain portion (e.g., 95%, 90%, 80%, 70%, 60%, 50%, etc.) of the center of the vertical extent of virtual reality environment 104 but not show main content in the remainder of the vertical extent of virtual reality environment 104. As another example, virtual reality environment 104 may not show main content in both a certain portion of the horizontal extent and the vertical extent of virtual reality environment 104. The remainder of virtual reality environment 104 in which main content is not shown may be blank space and may correspond to a peripheral area (e.g., peripheral areas 118, 120, 132, and 134) of the user's visual field (e.g., visual fields 114 and 126). Additional content 122 may be generated for display in the portion of virtual reality environment 104 that does not show main content. Thus, additional content 122 does not interfere with the main content even when additional content 122 is generated for display in a portion of virtual reality environment 104 corresponding to a peripheral area of the user's visual field.

Figure 3:
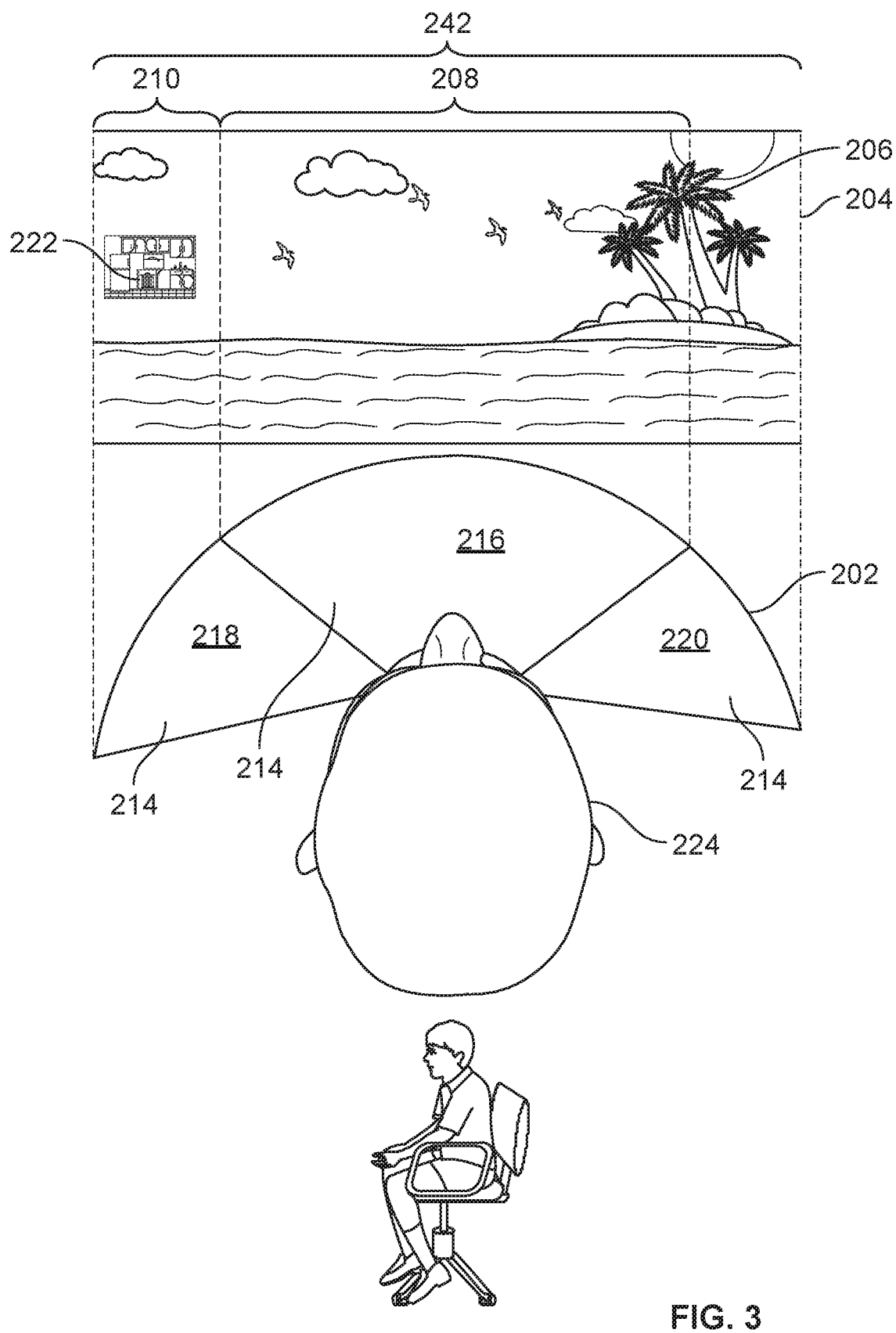
FIGS. 3-4 show an illustrative example of enabling a user to perform a full body movement while viewing a virtual reality environment on a heads up display without interfering with viewing of content on the heads up display.
Figure 4:
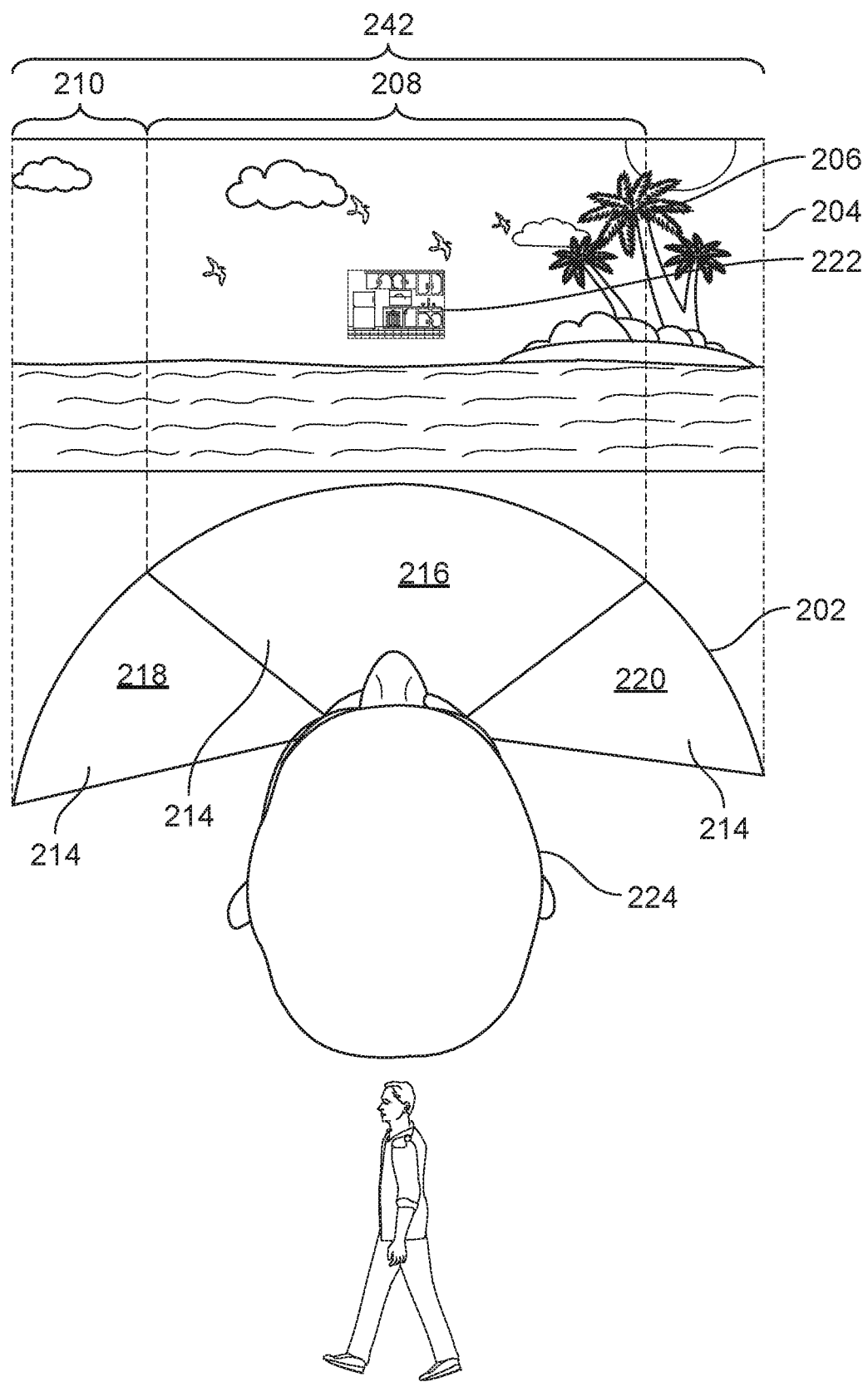

FIGS. 3-4 show an illustrative example of enabling a user to perform a full body movement while viewing a virtual reality environment on a heads up display without interfering with viewing of content on the heads up display.

In FIGS. 3-4, heads up display 202 shows virtual reality environment portion 242 of virtual reality environment 204. Virtual reality environment portion 242 of virtual reality environment 204 includes first portion 208 and second portion 210. First portion 208 includes portions of virtual reality environment 204 corresponding to foreground area 216 of visual field 214. Second portion 210 includes portions of virtual reality environment 204 corresponding to peripheral area 218 of visual field 214. Main content 206 is generated for display in first portion 208 of virtual reality environment 204. Additional content 222 is generated for display in second portion 210 of virtual reality environment 204. In FIG. 3, user 224 is sitting. In FIG. 4, user 224 is walking.

Full body movements of user 224 may be detected (for example, by detection module 616 on FIG. 8). For example, in FIGS. 3-4, the change of user 224 from a sitting position to a walking position is detected. In response to detecting the full body movement of user, additional content 222 is generated for display in first portion 208 of virtual reality environment 204. Additional content 222 may be any content that assists user 224 in performing the full body movement. For example, in FIGS. 3-4, additional content 222 is a video of the physical surroundings of user 224. Alternatively, additional content 222 may be a map of the location of user 224, etc.

By generating for display additional content 222 in a portion of virtual reality environment 204 that corresponds to foreground area 216, it is possible to ensure that user 224 can easily see additional content 222. Additional content 222 is configured to assist user 224 in performing the full body movement without interfering with the user's viewing of main content on heads up display 202. For example, if user 224 is walking, additional content 222 may be a video of the physical surroundings of user 224 that can assist the user 224 in, for example, avoiding obstacles in the physical surroundings without needing to stop viewing content on heads up display 202. Thus, generating for display additional content 222 in foreground area 216 enables the user 224 to perform the full body movement without interfering with the user's viewing of content on heads up display 202.

Main content 206 may be any type of content. In some embodiments, main content 206 provides media guidance data (as discussed in relation to FIGS. 6-7).

In FIGS. 3-4, additional content 222 is generated for display as a picture-in-picture. In some embodiments, additional content 222 is generated for display as an overlay.

In some embodiments, when additional content 222 is generated for display in a portion (e.g., second portion 210) of virtual reality environment 204 corresponding to a peripheral area (e.g., peripheral area 218) of the visual field (e.g., visual field 214) of user 224, the additional content 222 is generated for display at a lower image and/or video quality (e.g., lower resolution, frame rate, etc.) than main content (e.g., main content 206) shown by virtual reality environment 204. Generating for display additional content 222 at a lower image and/or video quality may help heads up display 202 conserve power, memory, bandwidth, etc. Additionally, generating for display additional content 222 at a lower image and/or video quality may not be detrimental to the user's viewing experience because user 224 may not be able to differentiate between high and low quality images and/or video viewed in peripheral areas (e.g., peripheral area 218) of the user's visual field (e.g., visual field 214). When additional content 222 is generated for display in a portion (e.g., first portion 208) of virtual reality environment 204 corresponding to a foreground area (e.g., foreground area 216) of the user's visual field (e.g., visual field 214), the image and/or video quality of the additional content 222 may be increased. User 224 may be able to differentiate between high and low quality images and/or video viewed in foreground areas of the user's visual field. By generating for display additional content 222 at a higher image and/or video quality, it is ensured that the user's viewing of additional content 222 is not compromised (e.g., by user 224 needing to view a low quality version of additional content 222).

In some embodiments, virtual reality environment 204 includes portions that show main content and portions that do not show main content. For example, a certain portion of the center of virtual reality environment 204 may show main content (e.g., main content 206) while the remainder of virtual reality environment 204 does not show main content. For example, virtual reality environment 204 may show main content in a certain portion (e.g., 95%, 90%, 80%, 70%, 60%, 50%, etc.) of the center of the horizontal extent of virtual reality environment 204 but not show main content in the remainder of the horizontal extent of virtual reality environment 204. As another example, virtual reality environment 204 may show main content in a certain portion (e.g., 95%, 90%, 80%, 70%, 60%, 50%, etc.) of the center of the vertical extent of virtual reality environment 204 but not show main content in the remainder of the vertical extent of virtual reality environment 204. As another example, virtual reality environment 204 may not show main content in both a certain portion of the horizontal extent and the vertical extent of virtual reality environment 204. The remainder of virtual reality environment 204 in which main content is not shown may be blank space and may correspond to a peripheral area (e.g., peripheral areas 218 and 220) of the user's visual field (e.g., visual field 214). Before the full body movement of the user is detected, additional content 222 may be generated for display in a portion of virtual reality environment 204 that does not show main content. Thus, additional content 222 does not interfere with the main content even when additional content 222 is generated for display in a portion of virtual reality environment 204 corresponding to a peripheral area of the user's visual field. After the full body movement of the user is detected, additional content 222 may be generated for display in a portion of the virtual reality environment 204 that does show main content.

Figure 5:
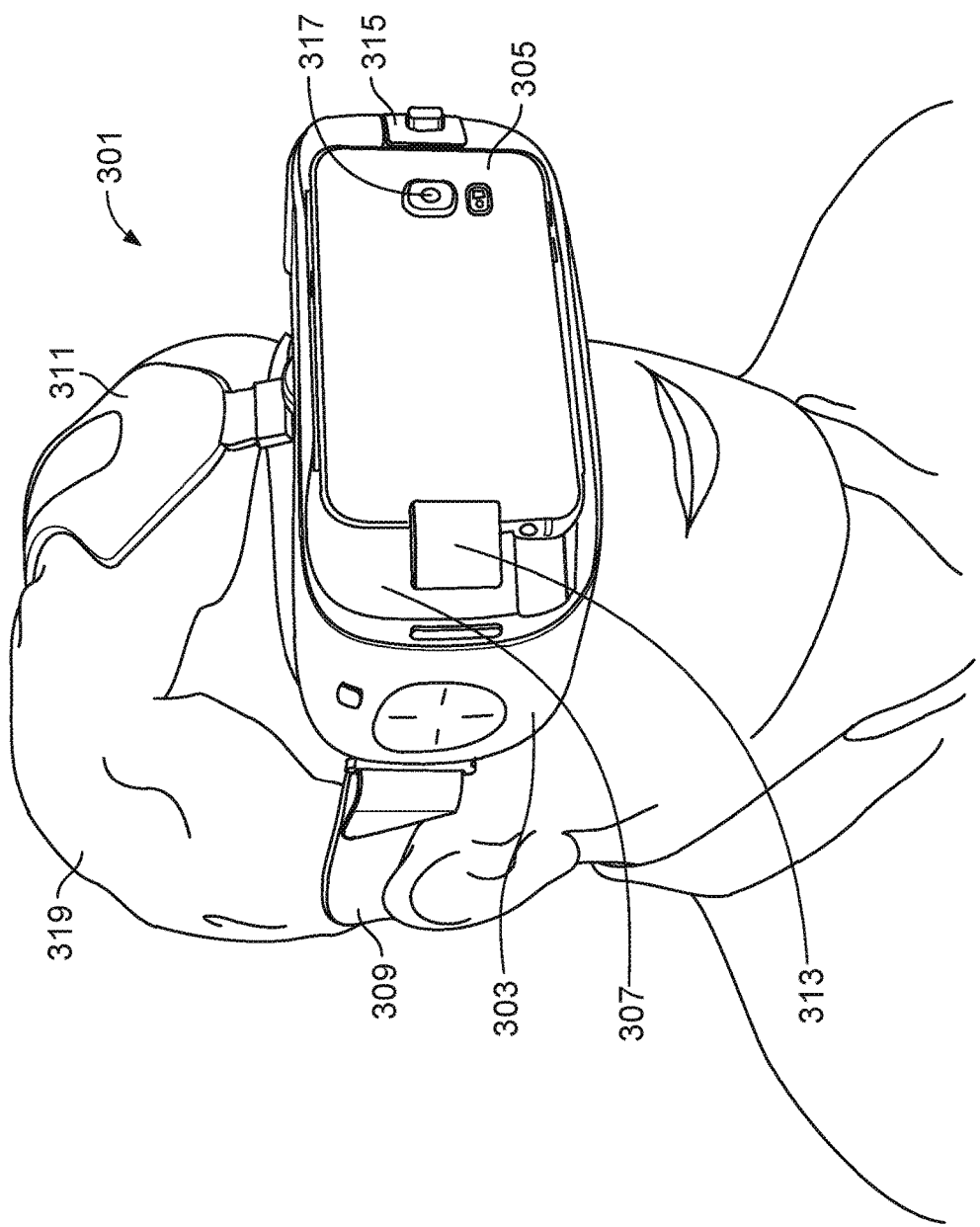
FIG. 5 shows an illustrative head-mounted display for use as a heads up display in accordance with certain embodiments of the disclosure.

FIG. 5 shows an illustrative head-mounted display for use as a heads up display in accordance with certain embodiments of the disclosure. Head-mounted display 301 includes headset 303 and mobile phone 305. Headset 303 includes display 307, straps 309 and 311, and clips 313 and 315. Mobile phone 305 includes camera 317. Head-mounted display 301 is physically coupled to the head of user 319.

Display 307 is located over the eyes of user 319. Because display 307 completely covers the eyes of user 319, display 307 gives content it generates for display a semblance of reality for user 319. Therefore, display 307 operates as a heads up display. Display 307 is physically coupled to straps 309 and 311. Strap 309 wraps around the head of user 319 and strap 311 wraps over the head of user 319. Straps 309 and 311 secure display 307 over the eyes of user 317. Other configurations for headset 303 are possible. For example, one or both of straps 309 and 311 may be absent. In some embodiments, headset 303 is configured as a helmet sitting on the head of user 319. In some embodiments, headset 303 is configured as eyeglasses resting on the ears of user 319. In some embodiments, display 307 is located over only one eye of user 319.

Mobile phone 305 is physically coupled to headset 303 such that mobile phone 305 is located on the opposite side of display 307 as the eyes of user 317. Mobile phone 305 is physically coupled to headset 303 by clips 313 and 315. Other configurations for mobile phone 305 are possible. For example, one or both of clips 313 and 315 may be absent. Mobile phone 305 may be physically coupled to headset 303 by fitting snugly into a recess in headset 303. Mobile phone 305 may be physically coupled to headset 303 by straps, screws, adhesive, or any other coupling means. A panel or lip physically coupled to headset 303 may hold mobile phone 305 in place. Mobile phone 305 may be inserted into a slot in headset 303.

Camera 317 faces away from display 307 such that camera 317 is capable of capturing images and video of the physical surroundings of user 317. Camera 317 may feed a video of the physical surroundings of user 317 to head-mounted display 301. The video of the physical surroundings of user 317 may be used as additional content 122 or 222. In some embodiments, the video of the physical surroundings of user 317 is fed to head-mounted display 301 by an electrical connection between head-mounted display 301 and mobile phone 305. For example, there may be an electrical cable with a USB interface serving as the electrical connection. In some embodiments, the video of the physical surroundings of user 317 may be fed to head-mounted display 301 wirelessly, such as over a wireless network or through a Bluetooth connection. In some embodiments, a screen on mobile phone 305 displays the video of the physical surroundings of user 317, and the screen on mobile phone 305 is visible through display 307 of head-mounted display 301.

In some embodiments, mobile phone 305 is absent, and camera 317 is integrated into headset 303. In some embodiments, mobile phone 305 is replaced by another electronic device, such as a tablet device.

Head-mounted display 301 may provide user 319 with a more immersive viewing experience than other devices provide. For example, because the display 307 fully covers the user's eyes, content displayed by display 307 may have a semblance of reality for user 319. Additionally, user 319 user may view content on the display 307 without distractions from the physical surroundings.

However, challenges arise because the display 307 fully covers the eyes of user 319. For example, user 319 may wish to monitor something in the physical surroundings, such as a child, food being cooked, people entering the room in which the user 319 is located, etc. Monitoring the physical surroundings by user 319 is difficult if the display 307 fully cover's the eyes of user 319. Therefore, displaying on display 307 additional content (for example, additional content 122) consisting of a video feed of the user's physical surroundings captured by the camera 317 may be desirable.

However, challenges arise with displaying a video of the user's physical surroundings as additional content on the display 307. The video of the user's physical surroundings may interfere with the user's viewing of main content (for example, second main content 144) on the display 307. In particular, if the video of the user's physical surroundings is displayed on a portion of the display 307 corresponding to a foreground area of the visual field of user 319, the video of the user's physical surroundings may interfere with the user's viewing of the main content on the display 307. Therefore, in accordance with embodiments described above in relation to FIGS. 1-2, additional content 122 is generated for display in a portion of a virtual reality environment corresponding to a peripheral area of the visual field of the user. If a change in the visual field of the user (for example, due to a movement in the center of gaze of the user) is detected, and it is determined that the portion of the virtual reality environment in which the additional content is generated for display corresponds to a foreground area of the visual field of the user, the additional content is moved to a portion of the virtual reality environment corresponding to a peripheral area of the visual field of the user.

Further challenges arise if user 319 performs full body movements while wearing head-mounted display 301. For example, user 319 may desire to view content on head-mounted display 301 while walking, but may be unable to see obstacles in the physical surroundings. Therefore, in accordance with embodiments described above in relation to FIGS. 3-4, additional content 222 is generated for display in a portion of virtual reality environment 204 corresponding to a foreground area of the visual field of the user. Additional content 222 is configured to assist the user in performing the full body movement. For example, additional content 222 may be a video of the user's physical surroundings. By generating for display additional content 222 in a portion of virtual reality environment 204 corresponding to a foreground area of the visual field of the user, the user is able to easily see the additional content 222. The user can use additional content 222 to perform the full body movement and avoid having to remove head-mounted display 301 and having to interfere with viewing of content on head-mounted display 301.

Figure 6:
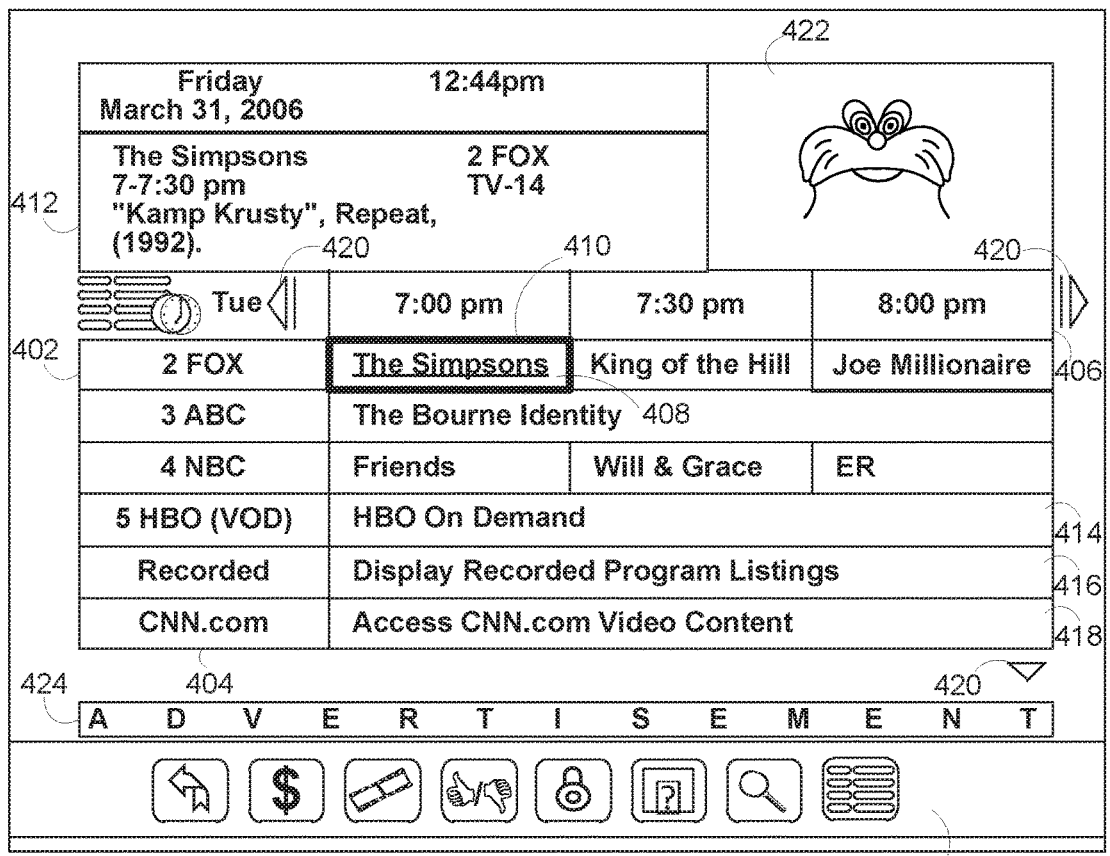
FIG. 6 shows an illustrative media listing display in accordance with some embodiments of the disclosure.
Figure 7:
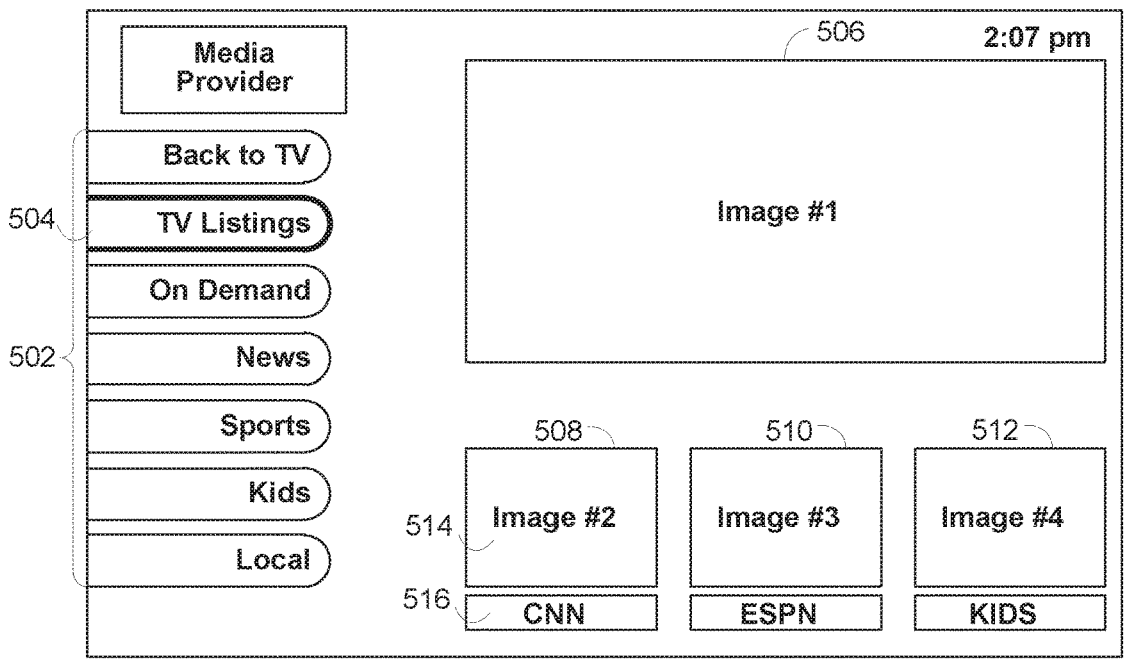
FIG. 7 shows another illustrative media listing display in accordance with some embodiments of the disclosure.

FIGS. 6-7 show illustrative display screens that may be used to provide media guidance data. The display screens shown in FIGS. 6-7 may be implemented on any suitable user equipment device or platform (for example, heads up display 102 or head-mounted display 301). While the displays of FIGS. 6-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 6 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, advertisement 424, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 424 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 402. Advertisement 424 may also be for products or services related or unrelated to the content displayed in grid 402. Advertisement 424 may be selectable and provide further information about content, provide information about a product or a service, enable purchasing of content, a product, or a service, provide content relating to the advertisement, etc. Advertisement 424 may be targeted based on a user's profile/preferences, monitored user activity, the type of display provided, or on other suitable targeted advertisement bases.

While advertisement 424 is shown as rectangular or banner shaped, advertisements may be provided in any suitable size, shape, and location in a guidance application display. For example, advertisement 424 may be provided as a rectangular shape that is horizontally adjacent to grid 402. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 9. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 7. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content, the media guidance application (and its display screens described above and below from one or more of their user equipment devices (for example, heads up display 102 or head-mounted display 301). FIG. 8 shows a generalized embodiment of illustrative user equipment device 600. More specific implementations of user equipment devices are discussed below in connection with FIG. 9. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 8 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for an application stored in memory (i.e., storage 608). Specifically, control circuitry 604 may be instructed by the application to perform the functions discussed above and below. For example, the application may provide instructions to control circuitry 604 to generate the displays. In some implementations, any action performed by control circuitry 604 may be based on instructions received from the application.

In client-server based embodiments, control circuitry 604 may include communications circuitry suitable for communicating with a guidance application server or other networks or servers. The instructions for carrying out the above mentioned functionality may be stored on the guidance application server.

Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 9). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 9, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Control circuitry 604 includes detection module 616. Detection module 616 will be discussed in further detail in relation to FIGS. 10-12.

Figure 9:
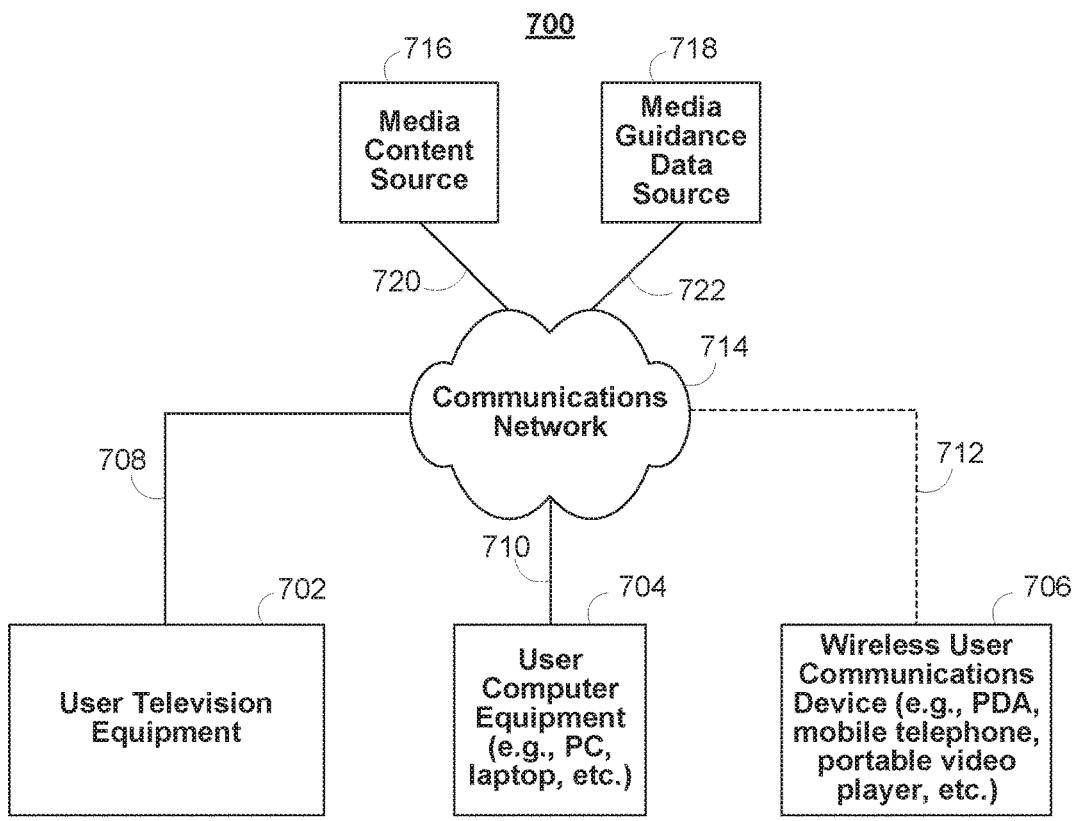
FIG. 9 is a block diagram of an illustrative media system in accordance with some embodiments of the disclosure.

User equipment device 600 of FIG. 8 can be implemented in system 700 of FIG. 9 as user television equipment 702, user computer equipment 704, wireless user communications device 706, a heads up display (for example, head-mounted 301) or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 8 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some user television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 9 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 9 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 9 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 9 to avoid overcomplicating the drawing. In addition, there may be more than one of each of content source 716 and media guidance data source 718, but only one of each is shown in FIG. 9 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 9.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 8.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 10:
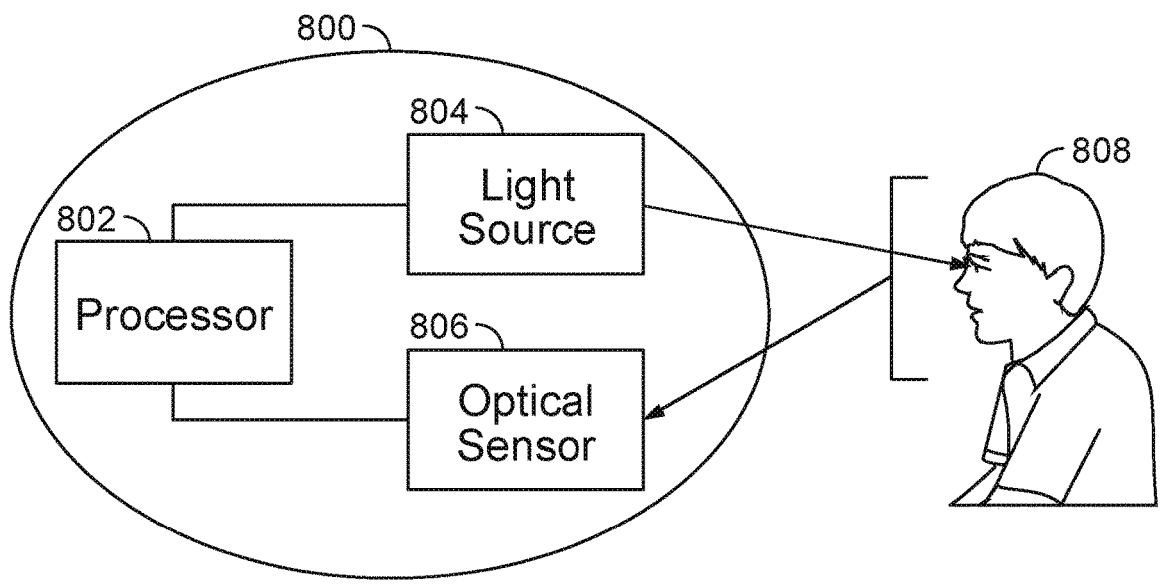
FIG. 10 is an illustrative example of one component of a detection module, which may be accessed in accordance with some embodiments of the disclosure.

FIG. 10 is an illustrative example of one component of detection module 616, which may be accessed in accordance with some embodiments of the disclosure. FIG. 10 shows gaze point detection component 800, which may be used to identify the center of gaze position of a user 808.

Gaze point detection component 800 includes processor 802, light source 804, and optical sensor 806. Light source 804 transmits light that reaches at least one eye of user 808, and optical sensor 806 is directed at user 808 to sense reflected light. Optical sensor 806 transmits collected data to processor 802, and based on the data received from optical sensor 806, processor 802 determines the gaze point of the user 808.

Processor 802 may be integrated with one or more light sources 804 and one or more optical sensors 806 in a single device. Additionally or alternatively, one light source 804 may transmit light to both eyes of user 808. Additionally or alternatively, one light source 804 may transmit light to one eye of user 808 and another light source 804 may transmit light to the other eye of user 808. Additionally or alternatively, one or more light sources 804 and one or more optical sensors 806 may be housed separately from processor 802 and in wireless or wired communication with processor 802. One or more of processors 802, light sources 804, and optical sensors 806 may be integrated into user equipment device 600.

Processor 802 may be similar to processing circuitry 606 described above. In some embodiments, processor 802 may be processing circuitry 606, with processing circuitry 606 in communication with light source 804 and optical sensor 806. In other embodiments, processor 802 may be separate from but optionally in communication with processing circuitry 606.

Light source 804 transmits light to one or both eyes of one or more users. Light source 804 may emit, for example, infrared (IR) light, near infrared light, or visible light. The light emitted by light source 804 may be collimated or non-collimated. The light is reflected in a user's eye, forming, for example, the reflection from the outer surface of the cornea (i.e. a first Purkinje image), the reflection from the inner surface of the cornea (i.e. a second Purkinje image), the reflection from the outer (anterior) surface of the lens (i.e. a third Purkinje image), and/or the reflection from the inner (posterior) surface of the lens (i.e. a fourth Purkinje image).

Optical sensor 806 collects visual information, such as an image or series of images, of one or both of one or more users' eyes. Optical sensor 806 transmits the collected image(s) to processor 802, which processes the received image(s) to detect location of a glint (i.e. corneal reflection) and/or other reflection in one or both eyes of one or more users. Processor 802 may also determine the location of the pupil of one or both eyes of one or more users. For each eye, processor 802 may compare the location of the pupil to the location of the glint and/or other reflection to determine the gaze point of each eye. Processor 802 may also store or obtain information describing the location of one or more light sources 804 and/or the location of one or more optical sensors 806 relative to display 612. Using this information, processor 802 may determine a gaze point of each eye of user 808 relative to display 612. Processor 802 may calculate the midpoint between the gaze point of each eye of user 808 to determine the center of gaze position of user 808. Processor 802 may compare the current center of gaze position of user 808 to a previously-stored (for example, in storage 608) center of gaze position of user 808 to determine that the center of gaze of user 808 has moved.

In some embodiments, gaze point detection component 800 performs best if the position of a user's head is fixed or relatively stable. In other embodiments, gaze point detection component 800 is configured to account for a user's head movement, which allows the user a more natural viewing experience than if the user's head were fixed in a particular position.

In some embodiments accounting for a user's head movement, gaze point detection component 800 includes two or more optical sensors 806. For example, two cameras may be arranged to form a stereo vision system for obtaining a 3D position of the user's eye or eyes; this allows processor 802 to compensate for head movement when determining the user's gaze point. The two or more optical sensors 806 may be part of a single unit or may be separate units. For example, user equipment device 600 may include two cameras used as optical sensors 806, or gaze point detection component 800 in communication with user equipment device 600 may include two optical sensors 806. In other embodiments, each of user equipment device 600 and gaze point detection component 800 may include an optical sensor, and processor 802 receives image data from the optical sensor of user equipment device 600 and the optical sensor of gaze point detection component 800. Processor 802 may receive data identifying the location of optical sensor 806 relative to the display 612 and/or relative to each other and use this information when determining the gaze point.

In other embodiments accounting for a user's head movement, gaze point detection component 800 includes two or more light sources for generating multiple glints. For example, two light sources 804 may create glints at different locations of an eye; having information on the two glints allows the processor to determine a 3D position of the user's eye or eyes, allowing processor 802 to compensate for head movement. Processor 802 may also receive data identifying the location of light sources 804 relative to the display 612 and/or relative to each other and use this information when determining the gaze point.

In some embodiments, gaze point detection component 800 is configured to account for visual impairments of users. For example, if user 808 is blind in one eye, gaze point detection component 800 may not transmit light to that eye and not base its determination of center of gaze on that eye. For example, if user 808 is blind in the left eye, the center of gaze may be determined to be the gaze point of the right eye. As another example, if user 808 has a lazy eye, gaze point detection component 800 may not transmit light to that eye and not base its determination of center of gaze on that eye. As another example, if user 808 has a lazy left eye and a movement of the left eye of the user 808 is detected, gaze point detection component 800 may be configured to ignore that movement.

In some embodiments, other types of gaze point detection components that do not utilize a light source may be used. For example, optical sensor 806 and processor 802 may track other features of a user's eye, such as the retinal blood vessels or other features inside or on the surface of the user's eye, and follow these features as the eye rotates. Any other equipment or method for determining one or more users' gaze point(s) not discussed above may be used in addition to or instead of the above-described embodiments of gaze point detection component 800.

It should be noted that gaze point detection component 800 is but one type of component that may be incorporated into or accessible by detection module 616. Other types of components, which may generate other types of data (e.g., video, audio, textual, etc.) are fully within the bounds of this disclosure.

Figure 11:
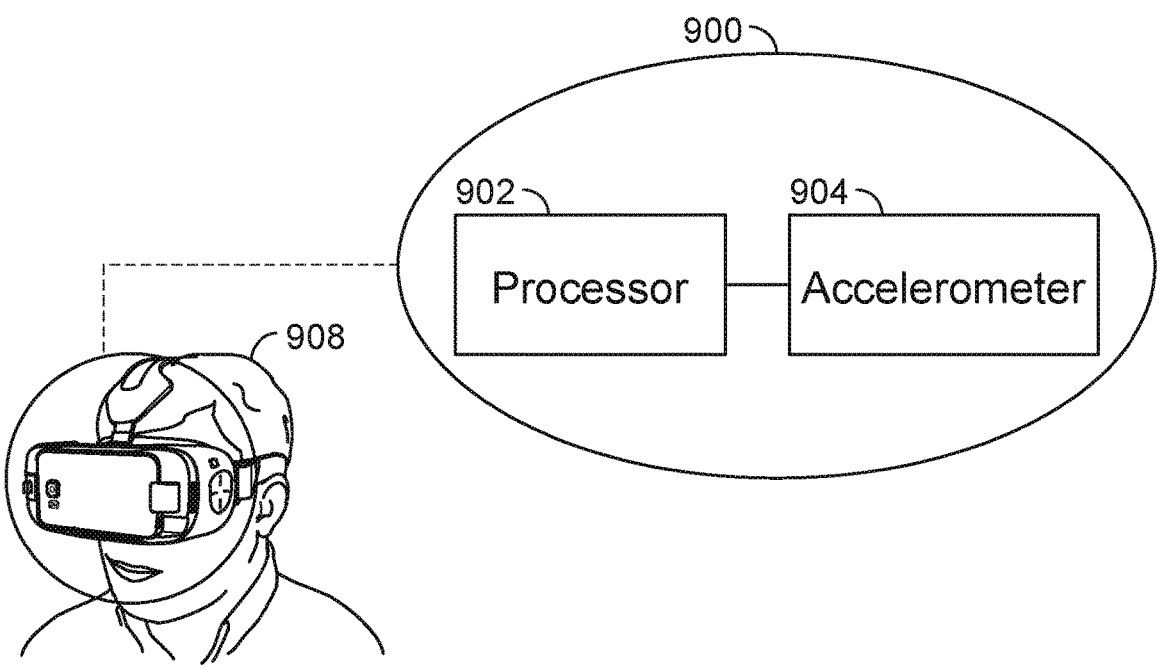
FIG. 11 is another illustrative example of one component of a detection module, which may be accessed in accordance with some embodiments of the disclosure.

FIG. 11 is another illustrative example of one component of detection module 616, which may be accessed in accordance with some embodiments of the disclosure. FIG. 11 shows head movement detection component 900, which may be used to detect movement of the head of user 908. Head movement detection component 900 includes processor 902 and accelerometer 904. Accelerometer 904 is physically coupled to the user's head. For example, if user equipment device 600 is a head-mounted display physically coupled to the head of the user 908 (for example, head-mounted display 301 of FIG. 5), accelerometer 904 may be included in the head-mounted display. Accelerometer 904 may be capable of detecting its own acceleration in one dimension, two dimensions, or three dimensions. Accelerometer 904 may be a capacitive accelerometer, a piezoelectric accelerometer, a micro-electromechanical (MEMS) accelerometer, or any other type of accelerometer.

Processor 902 may be integrated with one or more accelerometers 904 in a single device. Additionally or alternatively, one or more accelerometers 904 may be housed separately from processor 902 and in wireless or wired communication with processor 902. One or more of processors 902 and accelerometers 904 may be integrated into user equipment device 600.

Processor 902 may be similar to processing circuitry 606 described above. In some embodiments, processor 902 may be processing circuitry 606, with processing circuitry 606 in communication with accelerometer 904. In other embodiments, processor 902 may be separate from but optionally in communication with processing circuitry 906.

If the user's head moves or rotates in a certain direction, accelerometer 904 will detect the acceleration transmit an output to processor 902 that the user's head is accelerating in that direction for a certain amount of time. Additionally, accelerometer 904 may transmit an output to processor 902 that the user's head is accelerating with a certain acceleration magnitude.

Processor 902 may store or obtain information describing the location of one or more accelerometers 904 relative to the display 612. Using this information, as well as information about the direction, duration, and magnitude of the acceleration of the user's head as received from accelerometer 904, processor 902 may determine a new position of the head of user 908 relative to display 612. Processor 902 may store or obtain information describing the location of one or more accelerometers 904 relative to the eyes of user 908. Assuming that user 908 is looking straight ahead, processor 902 may use this information as well as information about the new position of the head of user 908 to detect that the center of gaze of user 908 has moved and to determine the new center of gaze position of user 908.

Accelerometer 904 may be configured to detect a footstep of a user by detecting movements of the user's head upwards, forwards, and downwards in succession. In some embodiments, accelerometer 904 is configured to use calibration data to detect footsteps of a user. In such embodiments, a user may take a footstep and accelerometer 904 may save parameters such as acceleration direction, magnitude, and timing during the footstep. Future movements substantially matching these parameters may be identified by accelerometer 904 as a footstep.

Accelerometer 904 may output to processor 902 that the user took a footstep in response to detecting the footstep. Processor 902 may determine, based on the output of the accelerometer 904, that the user performed a full body movement. In some embodiments, in response to detection of a first footstep, control circuitry 604 generates for display additional content (for example, additional content 222) in a portion of a virtual reality environment (for example, virtual reality environment 104) corresponding to a foreground area of a user's visual field, as described in relation to FIGS. 3-4. In some embodiments, in response to detection of a second footstep, control circuitry 604 enlarges the size of the additional content. In some embodiments, in response to detection of a second footstep, control circuitry 604 performs at least one of decreasing the opacity of the main content and increasing the opacity of the additional content. These features may be beneficial if, for example, the user wishes to focus more on the additional content and less on the main content while performing the full body movement.

If accelerometer 904 detects no substantial acceleration of the head of user 908, accelerometer 904 may output to processor 902 that the user is substantially stationary. In some implementations, in response to detection that the user is substantially stationary, control circuitry 604 generates for display the additional content in a portion of the display that is not in the foreground area of a user's visual field.

It should be noted that head movement detection component 900 is but one type of component that may be incorporated into or accessible by detection module 616. Other types of components, which may generate other types of data (e.g., video, audio, textual, etc.) are fully within the bounds of this disclosure.

Figure 12:
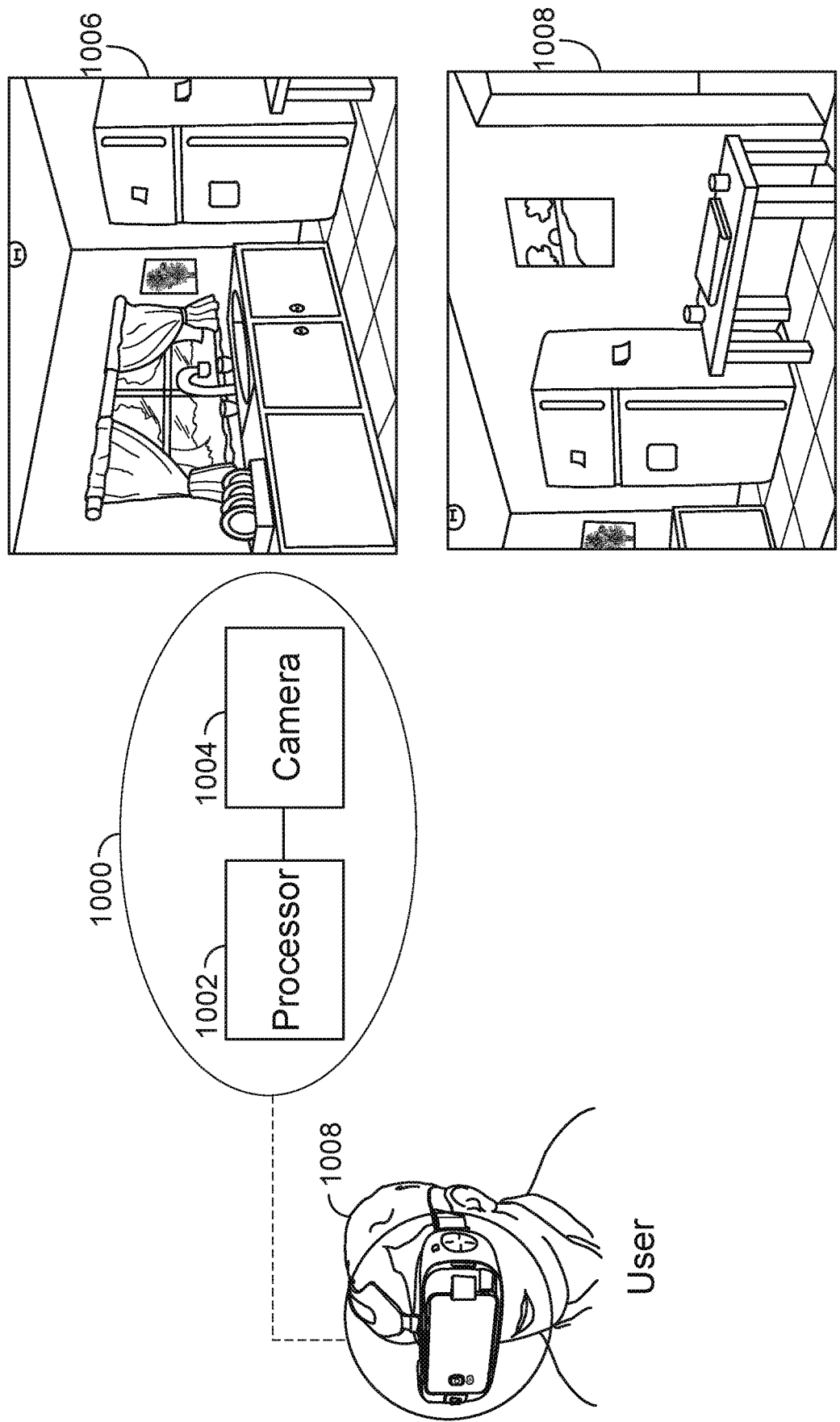
FIG. 12 is another illustrative example of one component of a detection module, which may be accessed in accordance with some embodiments of the disclosure.

FIG. 12 is another illustrative example of one component of detection module 616, which may be accessed in accordance with some embodiments of the disclosure. FIG. 12 shows movement detection component 1000, which may be used to detect movement of a user 1008 by detecting a change in a video of the user's physical surroundings. Movement detection component 1000 includes processor 1002 and camera 1004. Camera 1004 is physically coupled to user 1008. For example, camera 1004 may be coupled to the head of the user 1008. Camera 1004 may be a camera of a mobile phone included in a head-mounted display (for example, camera 317).

Camera 1004 is configured to capture images and/or videos of the user's physical surroundings and compare the captured images/videos to detect movement of the user. For example, as illustrated in FIG. 12, camera 1004 captures frame 1006 in a video of the user's physical surroundings and then captures frame 1008 in the video of the user's physical surroundings. Processor 1002 is configured to compare frame 1006 and frame 1008 and detect a change in the video of the user's physical surroundings. In FIG. 12, processor 1002 will determine that the user 1008 has moved to the right. In response to this determination, processor 1002 may determine that the center of gaze of the user has changed. Additionally or alternatively, in response to this determination, processor 1002 may determine that the user is performing a full body movement.

In some embodiments, occurrences in the user's physical surroundings (e.g., another person walking into the room in which the user is located, another person knocking on the door of the house in which the user is located, something dangerous occurring in the vicinity of the user, etc.) may be detected. For example, movement detection component 1000 may be configured to detect occurrences in the user's physical surroundings by capturing multiple frames of video of the user's physical surroundings and comparing the multiple frames to detect changes. In response to detecting an occurrence in the user's physical surroundings, user input interface 610 may present information to the user regarding the occurrence. For example, user input interface 610 may output a sound through speakers 614 indicating the occurrence or user input interface 610 may output text on display 612 indicating the occurrence. The indication of the occurrence may be a statement informing the user of the occurrence, for example, text or sound saying, "Someone has walked into the room." In some embodiments, user input interface 610 is configured to present the user with an option (for example, through speakers 614 or display 612) to react to the occurrence. For example, if the occurrence is a knock at a door, user input interface 610 may present the user with an option to automatically open the door. The user may respond to the option through voice, typing on a keyboard, or any other means of input. In some embodiments, control circuitry 604 is configured to present the user with additional information (for example, additional information 122 or 222) to assist the user in reacting to the occurrence. For example, control circuitry 604 may generate for display additional information including a video of the occurrence. For example, if the occurrence is a knock at a door, the additional information may be a video of the person at the door. In some embodiments, the additional information is generated for display in a portion of the virtual reality environment (e.g., virtual reality environments 104 or 204) corresponding to a foreground area of the user's visual field so the user can easily see the additional information. In some embodiments, the additional information replaces the additional information generated for display before the occurrence.

In some embodiments, occurrences in the user's physical surroundings are detected by one or more sensors (for example, sound sensors, temperature sensors, etc.). For example, a temperature sensor may detect a person walking into the room in which the user is located by detecting increased heat in the room. The one or more sensors may be integrated into user equipment device 600 or may be external to user equipment device 600, in which case the one or more sensors 600 are configured to transmit sensed information to user equipment device 600, for example, over a wireless network.

In some embodiments, control circuitry 604 is configured to determine a visual field (for example, second visual field 126) in response to a movement of the center of gaze of a user. In some embodiments, control circuitry 604 determines the new center of gaze of the user (for example, using gaze point detection component 800 or head movement detection component 900). The visual field of the user encompasses areas within a first number of degrees to the right and left of the new center of gaze, a second number of degrees above the center of gaze, and a third number of degrees below the center of gaze.

In some embodiments, the first number of degrees is equal to or greater than 95 degrees, for example, 95 degrees, 100 degrees, 105 degrees, 110 degrees, 115 degrees, 120 degrees, >120 degrees, or any suitable number of degrees. In some embodiments, the first number of degrees is less than 95 degrees, for example, 90 degrees, 85 degrees, 80 degrees, 75 degrees, 70 degrees, <70 degrees, or any suitable number of degrees. In some embodiments, the second number of degrees is equal to or greater than 60 degrees, for example, 65 degrees, 70 degrees, 75 degrees, 80 degrees, 85 degrees, >85 degrees, or any suitable number of degrees. In some embodiments, the second number of degrees is less than 60 degrees, for example, 55 degrees, 50 degrees, 45 degrees, 40 degrees, <40 degrees, or any suitable number of degrees. In some embodiments, the third number of degrees is equal to or greater than 70 degrees, for example, 75 degrees, 80 degrees, 85 degrees, 90 degrees, >90 degrees, or any suitable number of degrees. In some embodiments, the third number of degrees is less than 70 degrees, for example, 65 degrees, 60 degrees, 55 degrees, <55 degrees, or any suitable number of degrees.

In some embodiments, control circuitry 604 is configured to determine at least one foreground area of a visual field and at least one peripheral area of a visual field. Control circuitry 604 may determine a foreground area within a fourth number of degrees to the right and left of the center of gaze of the user, a fifth number of degrees above the center of gaze of the user, and a sixth number of degrees above the center of gaze of the user. The fourth, fifth, and sixth numbers may be smaller than the first, second, and third numbers, respectively. In some embodiments, the fourth, fifth, and sixth numbers of degrees are equal to or greater than 18 degrees, for example, 20 degrees, 25 degrees, 30 degrees, 35 degrees, >35 degrees, or any suitable number of degrees. In some embodiments, the fourth, fifth, and sixth numbers of degrees are less than 18 degrees, for example, 15 degrees, 10 degrees, 5 degrees, <5 degrees, or any suitable number of degrees.

In some implementations, control circuitry 604 is configured to account for visual impairments of a user in determining the visual field, foreground area, and/or peripheral area of the user. For example, if the user is blind in one eye, or has a visual impairment in one eye, control circuitry 604 may determine the visual field, foreground area, and peripheral area to only extend within a certain number of degrees of the unimpaired eye. As another example, if the peripheral vision of the user is impaired, control circuitry 604 may determine the peripheral area of the user to be smaller than for users without impaired peripheral vision. Control circuitry 604 may determine the visual field, foreground area, and peripheral area of each user using parameters specific to each user. For example, control circuitry 604 may account for a blind spot in an eye of a user in determining visual field, foreground area, and peripheral area.

In some implementations, user input interface 610 is configured to receive an input from the user and, in response to the input, control circuitry 604 is configured to generate for display additional content in a portion of the virtual reality environment corresponding to the foreground area of the visual field of the user. For example, in FIG. 2, upon receiving the input from the user, control circuitry 604 may generate for display additional content 122 in a portion (for example, second portion 110) of virtual reality environment 104 corresponding to foreground area 130 of second visual field 126. The user input may be any type of input, such as input via a remote control, mouse, trackball, keypad, keyboard, touch screen, touchpad, stylus input, joystick, voice recognition interface, or any other user input interface. For example, the user input may consist of the user saying, "Show me the additional content" or a similar statement. This feature may be beneficial if, for example, the user desires to be able to see the additional content easily in the foreground area of the user's visual field, and is not concerned about the additional content interfering with the user's viewing of main content.

In some implementations, user equipment device 600 further consists of a timer. The timer may be configured to measure a time period after a movement of a center of gaze of a user during which the center of gaze of a user has not substantially moved. For example, after a movement of the center of gaze of the user, the timer may be configured to measure a time during which the center of gaze of the user has not moved more than 1 mm, 5 mm, 1 cm, 10 cm, 100 cm, >100 cm, or any other suitable distance. Control circuitry 604 may be further configured to compare the time period to a threshold time period. For example, the threshold time period may be 1 millisecond, 10 milliseconds, 100 milliseconds, 1 second, 5 seconds, 10 seconds, >10 seconds, or any suitable time period. In response to determining that the time period measured by the timer is greater than the threshold time period, control circuitry 604 may be configured to generate for display additional content (for example, additional content 122) on a portion (for example, second portion 110) of a virtual reality environment (for example, virtual reality environment 104) corresponding to a peripheral area of the user's visual field (for example, peripheral area 132 of second visual field 126). In response to determining that the time period measured by the timer is less than the threshold time period, control circuitry 604 may be configured to not change the position of the additional content. Measuring the time period during which the center of gaze of the user has not substantially moved after a movement of the center of gaze of the user allows the control circuitry 604 to not move the additional content if the center of gaze of the user is moving rapidly. For example, if the center of gaze of the user is moving rapidly, it may be confusing and/or distracting for the user if the additional content also moves rapidly in response to the rapid movements of the center of gaze. As another example, the user may wish to look at the additional content for a short period of time (for example, 1 millisecond, 10 milliseconds, 100 milliseconds, 1 second, 5 seconds, 10 seconds, >10 seconds, etc.) with main vision and then look back at main content on the virtual reality environment. For example, if the additional content shows a video of the user's physical surroundings, the user may wish to quickly check on something in the physical surroundings, such as a nearby child, and then focus once more on main content. In such a situation, it may be helpful for the additional content to remain in place, rather than moving when the center of gaze of the user moves to look at the additional content and then quickly moves back to the main content.

In some embodiments, when the additional content is generated for display in a portion of the virtual reality environment corresponding to a peripheral area of the user's visual field, the additional content is generated for display at a lower image and/or video quality (for example, lower resolution, frame rate, etc.) than main content shown by the virtual reality environment. This can help to conserve power, memory, bandwidth, etc., of a heads up display (for example, heads up display 102) showing the virtual reality environment. Additionally, generating for display the additional content at a lower image and/or video quality may not be detrimental to the user's viewing experience because the user may not be able to differentiate between high and low quality images and/or video viewed in peripheral areas of the user's visual field. When the center of gaze of the user moves to look at the additional content for a short period of time, such that the additional content is in a location corresponding to a foreground area of the user's visual field, the image and/or video quality of the additional content may be increased. The user may be able to differentiate between high and low quality images and/or video viewed in foreground areas of the user's visual field. By generating for display the additional content at a higher image and/or video quality, it is ensured that the user's viewing of the additional content is not compromised (for example, by the user needing to view a low quality version of the additional content). When the center of gaze of the user moves back from the additional content to the main content, the image and/or video quality of the additional content may be decreased again.

In some implementations, user input interface 610 is configured to receive an input from the user and, in response to the input, control circuitry 604 is configured to remove additional content from a heads up display. For example, in FIG. 4, in response to the input, control circuitry 604 may remove additional content 222 from heads up display 222. The user input may be any type of input, such as input via a remote control, mouse, trackball, keypad, keyboard, touch screen, touchpad, stylus input, joystick, voice recognition interface, or any other user input interface. For example, the user input may consist of the user saying, "Remove the additional content" or a similar statement. This feature may be beneficial if, for example, the user does not require assistance from the additional content in performing a full body movement and prefers to view content on the heads up display without interference from the additional content. In some implementations, in response to the input, control circuitry 604 may move the additional content to a portion of the virtual reality environment corresponding to a peripheral area of the visual field of the user.

In some implementations, user input interface 610 is configured to present an option to the user to stop playback of main content being displayed on a heads up display. The option may be any type of output, such as output via a display or speaker. For example, the option may consist of text on a display reading, "Do you wish to stop playback of the video?" or a similar statement. This feature may be beneficial if, for example, the user desires to focus on performing a full body movement and does not want to miss content being displayed on the heads up display. Therefore, the feature provides, for example, an option to the user to pause playback of a media asset or any other type of content and then resume playback once the user has completed the fully body movement. Playback of the main content may resume automatically once it is detected that the user has completed the full body movement, or user input interface 610 may present another option to the user to resume playback of the main content.

Figure 13:
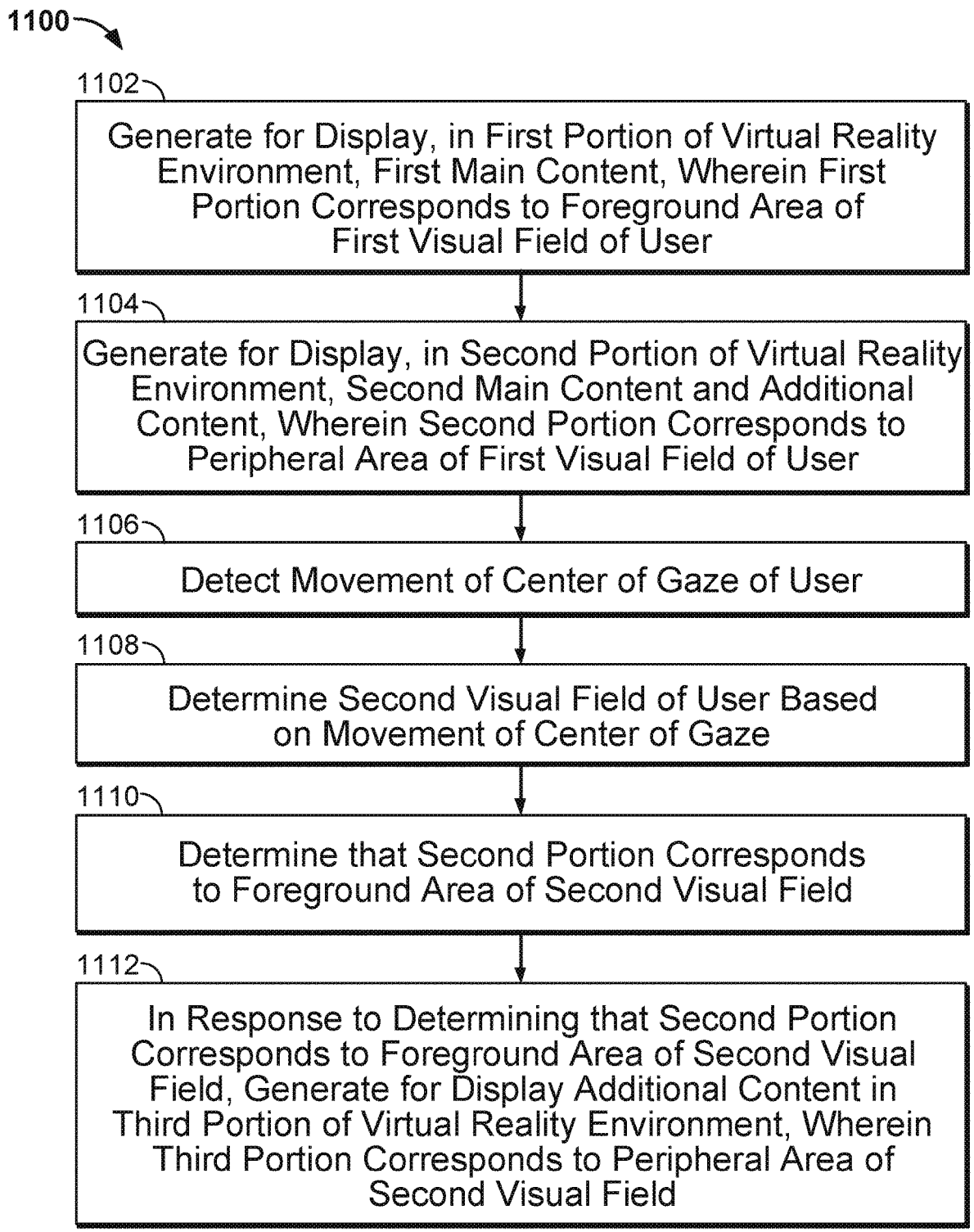
FIG. 13 is a flowchart of illustrative steps for presenting additional content in virtual reality environments on heads up displays showing main content without interfering with a user's viewing of the main content.

FIG. 13 is a flowchart of illustrative steps for presenting additional content in virtual reality environments on heads up displays showing main content without interfering with a user's viewing of the main content.

The main content may be any content that is intended to be the object of a user's main focus. For example, the main content may be a media asset, such as a movie, a television show, a video game, or a virtual reality world. As another example, the main content may be a media guidance screen.

The additional content may be any content that is not main content. The additional content may be unrelated to the main content or related to the main content. For example, the additional content may be a video of the user's physical surroundings, stock price information, sports score information, news information, weather information, a clock, or a schedule of events.

The virtual reality environment may be non-physical content displayed to a user in such a way that the non-physical content appears to the user to have a semblance of physicality. For example, the virtual reality environment may be a virtual world (for example, a virtual world in a game) which appears to the user to be the world in which user is located. As another example, the virtual reality environment may be non-physical content that appears to the user to be superimposed on the physical world. For example, the virtual reality environment may be a speedometer display (or any other display) that is superimposed on what the user sees through the windshield of his or her car (or any other transparent surface). As another example, the virtual reality environment may be a media asset (for example, a television show or a movie) presented to the user such that the display of the media asset fully encompasses the visual field of the user.

The heads up display may be any display capable of displaying non-physical content to a user in such a way that the non-physical content appears to the user to have a semblance of physicality. For example, the heads up display may be a head-mounted display that fully covers the eyes of the user. The head-mounted display may be configured as eyeglasses, binoculars, a helmet, etc. As another example, the heads up display may be a display (for example, a display integrated with a windshield or eyeglasses) that superimposes non-physical content on a view of the physical world which the user can see through the heads up display. As another example, the heads up display may be a room in which the user is located, where the room is covered in display screens.

It should be noted that process 1100, or any step thereof, could occur on, or be provided by, any of the devices shown in FIGS. 8-12. For example, process 1100 may be executed by control circuitry 604 (FIG. 8).

In step 1102, first main content is generated for display in a first portion of a virtual reality environment in a heads up display. The first portion corresponds to a foreground area of a first visual field of the user.

The first main content may be any portion of main content. The first main content may be a subset of the main content. For example, the first main content may be one or more objects or characters in a media asset. As another example, the first main content may be a particular area within a virtual world. As another example, the first main content may be a specific portion of a media guidance screen.

The first portion of the virtual reality environment may be any portion of the virtual reality environment. The first portion may be a subset of the virtual reality environment. The first portion may be a top, bottom, right, or left portion of the virtual reality environment. The first portion may be approximately a majority or approximately a minority of the virtual reality environment.

A visual field of the user may be anything that a user can see when the user is in a specific position. For example, the visual field may be determined based on movements of the user's head. As another example, the visual field may be determined based on movements of the user's center of gaze. For example, the visual field of the user may encompass areas within a first number of degrees to the right and left of the user's center of gaze, a second number of degrees above the center of gaze, and a third number of degrees below the center of gaze. For example, the first number of degrees may equal to or greater than 95 degrees, for example, 95 degrees, 100 degrees, 105 degrees, 110 degrees, 115 degrees, 120 degrees, >120 degrees, or any suitable number of degrees. Alternatively, the first number of degrees may be less than 95 degrees, for example, 90 degrees, 85 degrees, 80 degrees, 75 degrees, 70 degrees, <70 degrees, or any suitable number of degrees. For example, the second number of degrees may be equal to or greater than 60 degrees, for example, 65 degrees, 70 degrees, 75 degrees, 80 degrees, 85 degrees, >85 degrees, or any suitable number of degrees. Alternatively, the second number of degrees may be less than 60 degrees, for example, 55 degrees, 50 degrees, 45 degrees, 40 degrees, <40 degrees, or any suitable number of degrees. For example, the third number of degrees may be equal to or greater than 70 degrees, for example, 75 degrees, 80 degrees, 85 degrees, 90 degrees, >90 degrees, or any suitable number of degrees. Alternatively, the third number of degrees may be less than 70 degrees, for example, 65 degrees, 60 degrees, 55 degrees, <55 degrees, or any suitable number of degrees. The visual field may be the portions of a screen of a head-mounted display that the user can see. The visual field of the user may vary from user to user and may depend on visual impairments specific to each user.

A foreground area of a user's visual field may be any portion of the user's visual field that the user can see with normal vision. The foreground area may encompass a subset of the visual field. The foreground area may encompass areas of the visual field that are substantially in the center of the user's visual field. The foreground area may be determined based on movements of the user's head. As another example, the foreground area may be determined based on movements of the user's center of gaze. For example, the foreground area may be within a fourth number of degrees to the right and left of the center of gaze of the user, a fifth number of degrees above the center of gaze of the user, and a sixth number of degrees below the center of gaze of the user. For example, the fourth, fifth, and sixth numbers of degrees may be equal to or greater than 18 degrees, for example, 20 degrees, 25 degrees, 30 degrees, 35 degrees, >35 degrees, or any suitable number of degrees. Alternatively, the fourth, fifth, and sixth numbers of degrees may be less than 18 degrees, for example, 15 degrees, 10 degrees, 5 degrees, <5 degrees, or any suitable number of degrees. The foreground area may be the portions of a screen of a head-mounted display that the user can see with main vision. The foreground area may vary from user to user and may depend on visual impairments specific to each user.

In step 1104, second main content and additional content are generated for display in a second portion of the virtual reality environment in the heads up display. The second portion corresponds to a peripheral area of the first visual field of the user.

The second portion of the virtual reality environment may be any portion of the virtual reality environment. The second portion may be a subset of the virtual reality environment. The second portion may be different than the first portion. The second portion may be a top, bottom, right, or left portion of the virtual reality environment. The second portion may be near or at the boundary or corner of the virtual reality environment. The second portion may be approximately a majority or approximately a minority of the virtual reality environment.

The second main content may be any portion of main content. The second main content may be a subset of the main content. For example, the second main content may be one or more objects or characters in a media asset. As another example, the second main content may be a particular area within a virtual world. As another example, the second main content may be a specific portion of a media guidance screen.

A peripheral area of a user's visual field may be any portion of a user's visual field that the user can see with peripheral vision. The peripheral area may be areas that are substantially at the edges of the user's visual field. The peripheral area may be determined based on movements of the user's head. As another example, the peripheral field may be determined based on movements of the user's center of gaze. For example, the peripheral area may be any portion of the visual field that is not foreground area. For example, the peripheral area may encompass areas of the visual field within a certain number of degrees of the outer boundary of the visual field. The peripheral area may be the portions of a screen of a head-mounted display that the user can see with peripheral vision. The peripheral area may vary from user to user and may depend on visual impairments specific to each user.

In step 1106, a movement of a center of gaze of the user is detected. The center of gaze may be any area of the user's visual field to which the gaze of the user is substantially focused. The center of gaze may be a central portion of what a user can see. The center of gaze may be a midpoint between the gaze point of each eye of the user. In users with a visual impairment in one eye, the center of gaze may be the gaze point of the unimpaired eye. The movement of the center of gaze may be detected by detecting a gaze point of each eye of the user using light. The movement of the center of gaze may be detected by detecting a movement of the head of the user. The movement of the center of gaze may be detected by detecting a change in a video of the physical surroundings of the user with captured with a camera physically coupled to the user.

In step 1108, a second visual field of the user is determined based on the movement of the center of gaze of the user. For example, the control circuitry may determine the second visual field by determining the new center of gaze. For example, the control circuitry may determine the second visual field by detecting a movement of the head of the user.

In step 1110, it is determined that the second portion corresponds to a foreground area of the second visual field. For example, the second portion may correspond to a corner of the first visual field but correspond to the center of the second visual field.

In step 1112, in response to determining that the second portion corresponds to the foreground area of the second visual field, the additional content is generated for display in a third portion of the virtual reality environment, wherein the third portion corresponds to a peripheral area of the second visual field. The third portion of the virtual reality environment may be any portion of the virtual reality environment. The third portion may be a subset of the virtual reality environment. The third portion may be different than the first and second portions. The third portion may be a top, bottom, right, or left portion of the virtual reality environment. The third portion may be near or at the boundary or corner of the virtual reality environment. The third portion may be approximately a majority or approximately a minority of the virtual reality environment.

In some embodiments, detecting the movement of the center of gaze includes detecting the center of gaze of the user. In certain embodiments, detecting the center of gaze of the user includes transmitting light to each eye of the user; collecting an image of each eye of the user; detecting, in each image, a location of a reflection in an eye of the user; determining a location of each pupil of the user; comparing the location of each pupil to the location of each reflection; based on comparing the location of each pupil to the location of each reflection, determining a gaze point of each eye of the user; and determining the center of gaze by determining a midpoint between the gaze point of each eye of the user.

In certain embodiments, the heads up display is a head-mounted display physically coupled to the head of the user, the head-mounted display includes an accelerometer, and detecting the movement of the center of gaze of the user includes detecting, by the accelerometer, an acceleration of the head of the user.

In some embodiments, the heads up display is a head-mounted display physically coupled to the head of the user, the head-mounted display includes a camera feeding a video of the user's physical surroundings to the display, and generating for display the additional content comprises generating for display the video of the user's physical surroundings.

In certain embodiments, generating for display the additional content includes generating for display the additional content as a picture-in-picture.

In some embodiments, determining the second visual field of the user based on the movement of the center of gaze includes determining a new center of gaze based on the movement of the center of gaze and determining an area that is within a first number of degrees to the right and left of the new center of gaze, a second number of degrees above the new center of gaze, and a third number of degrees below the new center of gaze.

In certain embodiments, determining that the second portion corresponds to the foreground area of the second visual field comprises determining the foreground area of the second visual field, and determining the foreground area of the second visual field comprises determining an area that is within a fourth number of degrees to the right and left of the new center of gaze, a fifth number of degrees above the new center of gaze, and a sixth number of degrees below the new center of gaze, wherein the fourth number is smaller than the first number, the fifth number is smaller than the second number, and the sixth number is smaller than the third number.

In some embodiments, the process further includes receiving an input from the user and, in response to the input, generating for display the additional content in a portion of the virtual reality environment corresponding to a foreground area of the second visual field.

In certain embodiments, generating for display the additional content includes measuring a time period after the movement of the center of gaze of the user during which the center of the gaze of the user has not substantially moved; determining that the time period is greater than a threshold time period; and in response to determining that the time period is greater than the threshold time period, generating for display the additional content.

Figure 14:
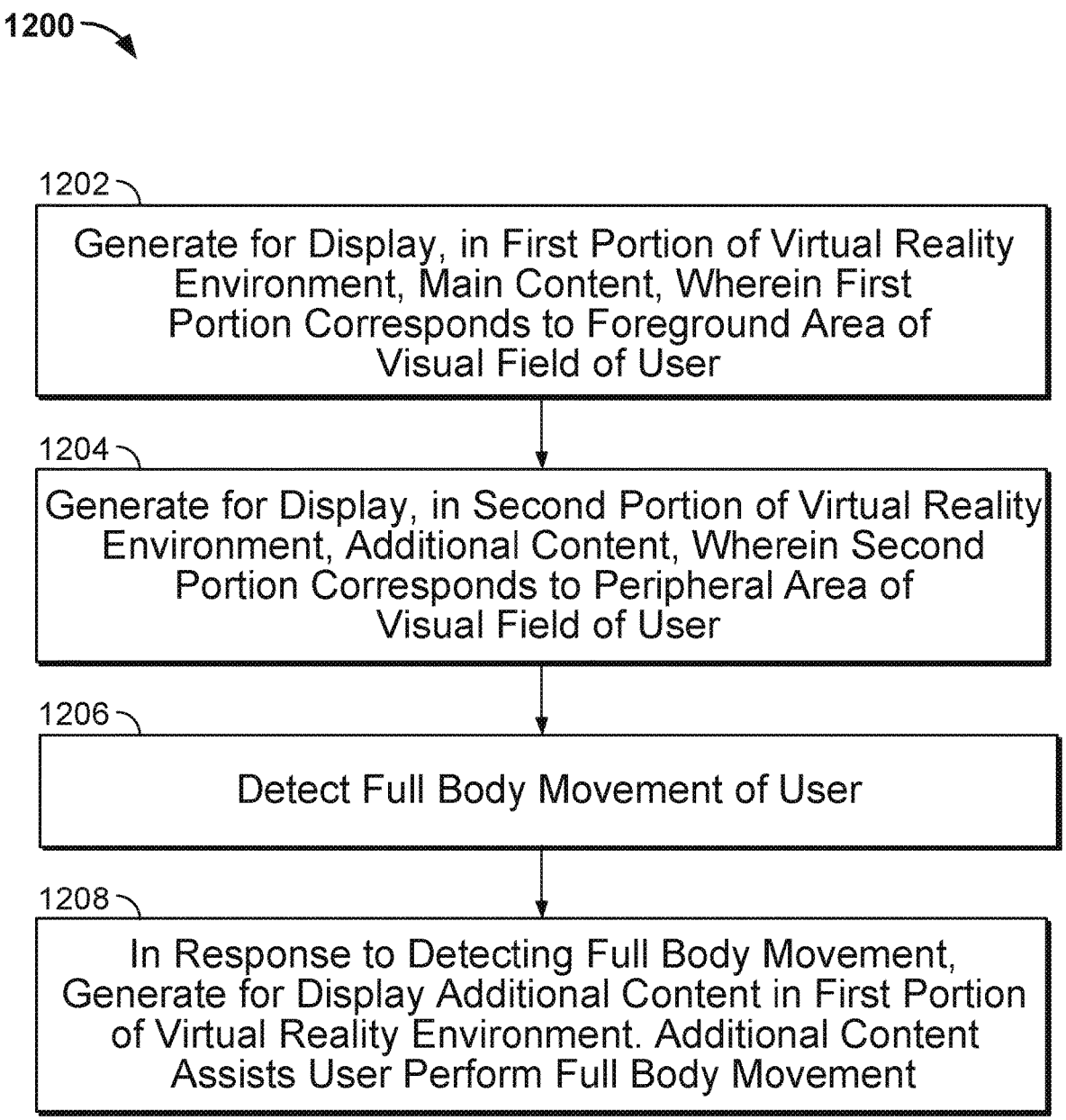
FIG. 14 is a flowchart of illustrative steps for enabling users to perform full body movements while viewing virtual reality environments on heads up displays without interfering with viewing of content on the heads up displays.

FIG. 14 is a flowchart of illustrative steps for enabling users to perform full body movements while viewing virtual reality environments on heads up displays without interfering with viewing of content on the heads up displays. The virtual reality environment may be non-physical content displayed to a user in such a way that the non-physical content appears to the user to have a semblance of physicality. For example, the virtual reality environment may be a virtual world (for example, a virtual world in a game) which appears to the user to be the world in which user is located. As another example, the virtual reality environment may be non-physical content that appears to the user to be superimposed on the physical world. For example, the virtual reality environment may be a speedometer display (or any other display) that is superimposed on what the user sees through the windshield of his or her car (or any other transparent surface). As another example, the virtual reality environment may be a media asset (for example, a television show or a movie) presented to the user such that the display of the media asset fully encompasses the visual field of the user.

The heads up display may be any display capable of displaying non-physical content to a user in such a way that the non-physical content appears to the user to have a semblance of physicality. For example, the heads up display may be a head-mounted display that fully covers the eyes of the user. The head-mounted display may be configured as eyeglasses, binoculars, a helmet, etc. As another example, the heads up display may be a display (for example, a display integrated with a windshield or eyeglasses) that superimposes non-physical content on a view of the physical world which the user can see through the heads up display. As another example, the heads up display may be a room in which the user is located, where the room is covered in display screens.

The full body movement may be any physical movement by a user that requires movement of a substantial portion of the user's entire body. For example, the full body movement may be walking, jumping, standing up, sitting down, rotating one's body, etc.

It should be noted that process 1200, or any step thereof, could occur on, or be provided by, any of the devices shown in FIGS. 8-12. For example, process 1200 may be executed by control circuitry 604 (FIG. 8).

In step 1202, main content is generated for display in a first portion of a virtual reality environment in a heads up display. The first portion corresponds to a foreground area of a visual field of the user.

The first portion of the virtual reality environment may be any portion of the virtual reality environment. The first portion may be a subset of the virtual reality environment. The first portion may be a top, bottom, right, or left portion of the virtual reality environment. The first portion may be approximately a majority or approximately a minority of the virtual reality environment.

The main content may be content that is intended to be the object of a user's main focus. For example, the main content may be a media asset, such as a movie, a television show, a video game, or a virtual reality world. As another example, the main content may be a media guidance screen.

A visual field of the user may be anything that a user can see when the user is in a specific position. For example, the visual field may be determined based on movements of the user's head. As another example, the visual field may be determined based on movements of the user's center of gaze. For example, the visual field of the user may encompass areas within a first number of degrees to the right and left of the user's center of gaze, a second number of degrees above the center of gaze, and a third number of degrees below the center of gaze. For example, the first number of degrees may equal to or greater than 95 degrees, for example, 95 degrees, 100 degrees, 105 degrees, 110 degrees, 115 degrees, 120 degrees, >120 degrees, or any suitable number of degrees. Alternatively, the first number of degrees may be less than 95 degrees, for example, 90 degrees, 85 degrees, 80 degrees, 75 degrees, 70 degrees, <70 degrees, or any suitable number of degrees. For example, the second number of degrees may be equal to or greater than 60 degrees, for example, 65 degrees, 70 degrees, 75 degrees, 80 degrees, 85 degrees, >85 degrees, or any suitable number of degrees. Alternatively, the second number of degrees may be less than 60 degrees, for example, 55 degrees, 50 degrees, 45 degrees, 40 degrees, <40 degrees, or any suitable number of degrees. For example, the third number of degrees may be equal to or greater than 70 degrees, for example, 75 degrees, 80 degrees, 85 degrees, 90 degrees, >90 degrees, or any suitable number of degrees. Alternatively, the third number of degrees may be less than 70 degrees, for example, 65 degrees, 60 degrees, 55 degrees, <55 degrees, or any suitable number of degrees. The visual field may be the portions of a screen of a head-mounted display that the user can see. The visual field may vary from user to user and may depend on visual impairments specific to each user.

A foreground area of a user's visual field may be any portion of the user's visual field that the user can see with normal vision. The foreground area may encompass a subset of the visual field. The foreground area may encompass areas of the visual field that are substantially in the center of the user's visual field. The foreground area may be determined based on movements of the user's head. As another example, the foreground area may be determined based on movements of the user's center of gaze. For example, the foreground area may be within a fourth number of degrees to the right and left of the center of gaze of the user, a fifth number of degrees above the center of gaze of the user, and a sixth number of degrees below the center of gaze of the user. For example, the fourth, fifth, and sixth numbers of degrees may be equal to or greater than 18 degrees, for example, 20 degrees, 25 degrees, 30 degrees, 35 degrees, >35 degrees, or any suitable number of degrees. Alternatively, the fourth, fifth, and sixth numbers of degrees may be less than 18 degrees, for example, 15 degrees, 10 degrees, 5 degrees, <5 degrees, or any suitable number of degrees. The foreground area may be the portions of a screen of a head-mounted display that the user can see with main vision. The foreground area may vary from user to user and may depend on visual impairments specific to each user.

In step 1204, additional content is generated for display in a second portion of the virtual reality environment in the heads up display. The second portion corresponds to a peripheral area of the visual field of the user.

The second portion of the virtual reality environment may be any portion of the virtual reality environment. The second portion may be a subset of the virtual reality environment. The second portion may be different than the first portion. The second portion may be a top, bottom, right, or left portion of the virtual reality environment. The second portion may be near or at the boundary or corner of the virtual reality environment. The second portion may be approximately a majority or approximately a minority of the virtual reality environment.

The additional content assists the user to perform the full body movement. For example, the additional content may be a video of the user's physical surroundings. As another example, the additional content may be a map of the user's physical surroundings.

A peripheral area of a user's visual field may be any portion of a user's visual field that the user can see with peripheral vision. The peripheral area may be areas that are substantially at the edges of the user's visual field. The peripheral area may be determined based on movements of the user's head. As another example, the peripheral field may be determined based on movements of the user's center of gaze. For example, the peripheral area may be any portion of the visual field that is not foreground area. For example, the peripheral area may encompass areas of the visual field within a certain number of degrees of the outer boundary of the visual field. The peripheral area may be the portions of a screen of a head-mounted display that the user can see with peripheral vision. The peripheral area may vary from user to user and may depend on visual impairments specific to each user.

In step 1206, a full body movement of the user is detected. For example, the full body movement may be detected by detecting an acceleration of a portion of the body of the user. For example, the detection module may be detected by detecting a footstep. As another example, the full body movement may be detected by detecting a change in a video of the physical surroundings of the user captured with a camera physically coupled to the user.

In step 1208, in response to detecting the full body movement of the user, the additional content is generated for display in the first portion of the virtual reality environment. The additional content assists the user to perform the full body movement. For example, the additional content may be a video of the user's physical surroundings. As another example, the additional content may be a map of the user's physical surroundings.

In some embodiments, the heads up display is a head-mounted display physically coupled to the head of the user, the head-mounted display includes a camera feeding a video of the user's physical surroundings to the display, and generating for display the additional content comprises generating for display the video of the user's physical surroundings.

In certain embodiments, generating for display the additional content comprises generating for display the additional content as a picture-in-picture.

In some embodiments, the heads up display is a head-mounted display physically coupled to the head of the user, the head-mounted display includes an accelerometer, and detecting the full body movement of the user comprises detecting, by the accelerometer, a first footstep taken by the user.

In certain embodiments, the process 1300 further includes detecting a second footstep taken by the user and, in response to the detecting of the second footstep, enlarging the additional content.

In some embodiments, the process 1300 further includes detecting a second footstep taken by the user and, in response to the detecting of the second footstep, performing at least one of decreasing an opacity of the main content and increasing an opacity of the additional content.

In certain embodiments, the process 1300 further includes receiving an input from the user and, in response to the input, removing the additional content from the heads up display.

In some embodiments, detecting the full body movement of the user comprises detecting a change in the video of the user's physical surroundings.

In certain embodiments, the process 1300 further includes detecting that the user is substantially stationary and, in response to the detecting that the user is substantially stationary, generating for displaying the additional content in a third portion of the display.

In some embodiments, the process 1300 further includes presenting an option to the user to stop playback of the main content.

Figure 15:
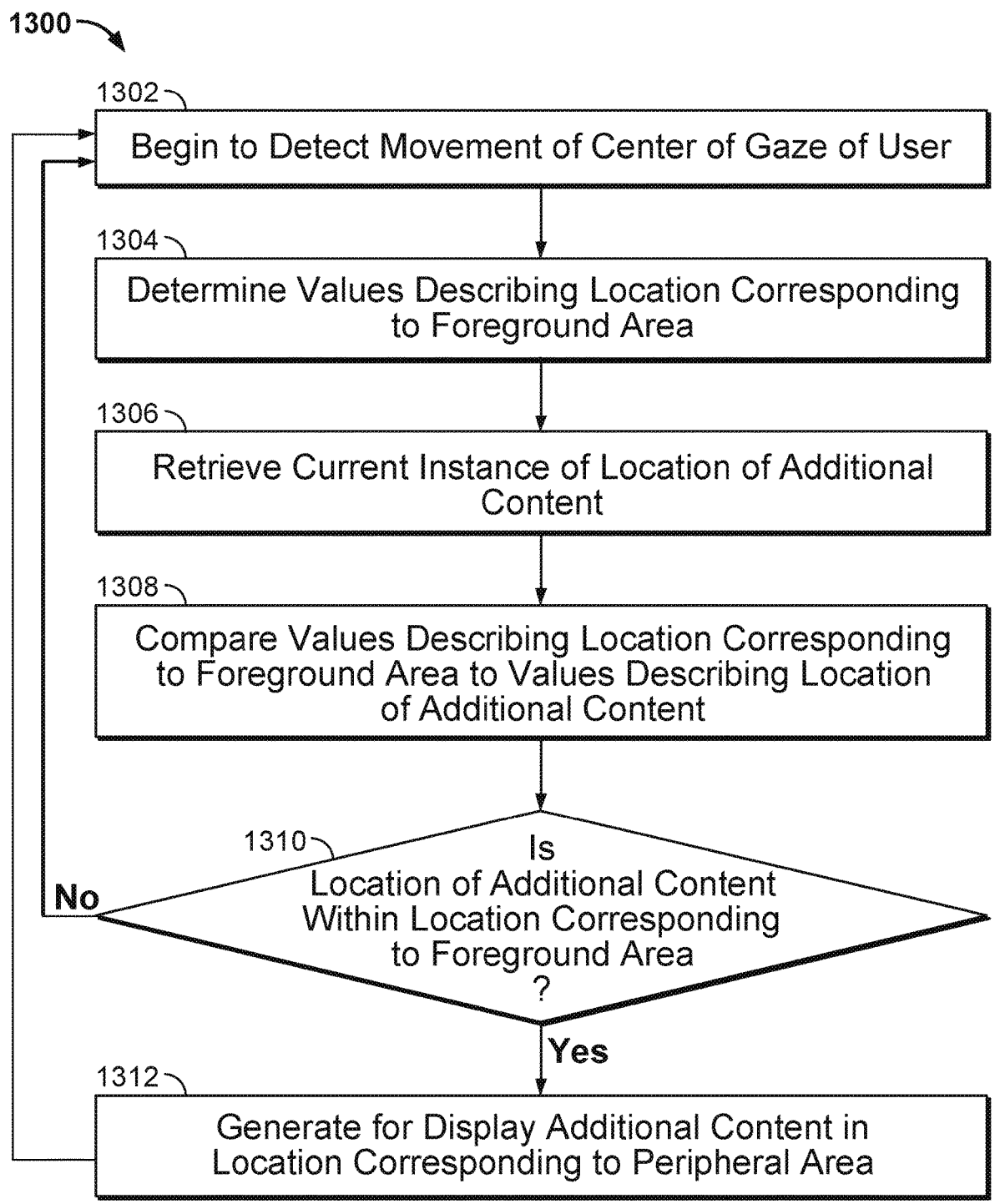
FIG. 15 describes a process implemented on control circuitry to present additional content in virtual reality environments on heads up displays showing main content without interfering with a user's viewing of the main content in accordance with some embodiments of the disclosure.

FIGS. 15 and 16 present processes for control circuitry (e.g., control circuitry 604) to present additional content in virtual reality environments on heads up displays showing main content without interfering with a user's viewing of the main content in accordance with some embodiments of the disclosure. In some embodiments this algorithm may be encoded on to a non-transitory storage medium (e.g., storage device 608) as a set of instructions to be decoded and executed by processing circuitry (e.g., processing circuitry 606). Processing circuitry may in turn provide instructions to other sub-circuits contained within control circuitry 604, such as the tuning, video generating, encoding, decoding, encrypting, decrypting, scaling, analog/digital conversion circuitry, and the like.

The flowchart in FIG. 15 describes a process 1300 implemented on control circuitry (e.g., control circuitry 604) to present additional content in virtual reality environments on heads up displays showing main content without interfering with a user's viewing of the main content in accordance with some embodiments of the disclosure.

At step 1302, control circuitry 604 will begin to detect a movement of a center of gaze of a user. In some embodiments, this may be done either directly or indirectly in response to a user action or input (e.g., from signals received by control circuitry 604, user input interface 610, or detection module 616). For example, the process may begin directly in response to control circuitry 604 receiving signals from detection module 616.

At step 1304, control circuitry 604 proceeds to determine values describing a location on the heads up display corresponding to a foreground area of a visual field of the user based on the movement of the center of gaze.

At step 1306, control circuitry 604 proceeds to retrieve the current instance of values describing the location of the additional content on the heads up display. In some embodiments control circuitry 604 may receive a single primitive data structure that represents the location of the additional content on the heads up display. In some embodiments the values describing the location of the additional content on the heads up display may be stored as part of a larger data structure, and control circuitry 604 may retrieve the values by executing appropriate accessor methods to retrieve the values from the larger data structure.

At step 1308, control circuitry 604 proceeds to compare the values describing the location on the heads up display corresponding to the foreground area of the visual field of the user to the values describing the location of the additional content on the heads up display. In some embodiments, control circuitry 604 may directly compare the values describing the location on the heads up display corresponding to the foreground area of the visual field of the user to the values describing the location of the additional content on the heads up display by accessing the values respectively and performing a value comparison. In some instances, control circuitry 604 may call a comparison function (e.g., for object to object comparison) to compare the values describing the location on the heads up display corresponding to the foreground area of the visual field of the user to the values describing the location of the additional content on the heads up display.

At step 1310, control circuitry 604 compares the values describing the location on the heads up display corresponding to the foreground area of the visual field of the user to the values describing the location of the additional content on the heads up display to determine if the location of the additional content on the heads up display is within the location on the heads up display corresponding to the foreground area of the visual field of the user. If the condition is not satisfied, the algorithm may proceed back to step 1302; if the condition is satisfied, the algorithm may proceed to step 1312 instead.

At step 1312, control circuitry 604 executes a subroutine to generate for display the additional content in a location on the heads up display that corresponds to a peripheral area of the visual field of the user. After the subroutine is executed, the algorithm may proceed back to step 1302.

It is contemplated that the descriptions of FIG. 15 may be used with any other embodiment of this disclosure. In addition, the descriptions described in relation to the algorithm of FIG. 15 may be done in alternative orders or in parallel to further the purposes of this disclosure. For example, conditional statements and logical evaluations, such as those at 1310, may be performed in any order or in parallel or simultaneously to reduce lag or increase the speed of the system or method. Furthermore, it should be noted that the process of FIG. 15 may be implemented on a combination of appropriately configured software and hardware, and that any of the devices or equipment discussed in relation to FIGS. 8-12 could be used to implement one or more portions of the process.

The pseudocode in FIG. 16 describes a process 1400 to present additional content in virtual reality environments on heads up displays showing main content without interfering with a user's viewing of the main content in accordance with some embodiments of the disclosure. It will be evident to one skilled in the art that the process described by the pseudocode in FIG. 16 may be implemented in any number of programming languages and a variety of different hardware, and that the style and format should not be construed as limiting, but rather a general template of the steps and procedures that would be consistent with code used to implement some embodiments of this disclosure.

At line 1401, control circuitry 604 runs a subroutine to initialize variables and prepare to present additional content in virtual reality environments on heads up displays showing main content without interfering with a user's viewing of the main content. For example, in some embodiments control circuitry 604 may copy instructions from non-transitory storage medium (e.g., storage device 608) into RAM or into the cache for processing circuitry 606 during the initialization stage. Additionally, in some embodiments the values describing the location on the heads up display corresponding to a foreground area of a visual field of the user being used for comparison, or a tolerance level for determining if two values are essentially equivalent, may be retrieved, set, and stored at 1401.

At line 1405, control circuitry 604 receives instances of the location on the heads up display corresponding to the foreground area of the visual field of the user. Control circuitry 604 may receive instances of the location on the heads up display corresponding to the foreground area of the visual field of the user by receiving, for example, a pointer to an array of values describing the location on the heads up display corresponding to the foreground area of the visual field of the user. In another example, control circuitry 604 may receive an object of a class, such as an iterator object containing elements of the values describing the location on the heads up display corresponding to the foreground area of the visual field of the user.

At line 1407, control circuitry 604 stores the values describing the location on the heads up display corresponding to the foreground area of the visual field of the user into a temporary variable "A." In some embodiments the values describing the location on the heads up display corresponding to the foreground area of the visual field of the user will be stored as part of a larger data structure or class, and the values describing the location on the heads up display corresponding to the foreground area of the visual field of the user may be obtained through appropriate accessor methods. In some embodiments the values describing the location on the heads up display corresponding to the foreground area of the visual field of the user may be converted from a string or other non-numeric data type into a numeric data type by means of an appropriate hashing algorithm. In some embodiments, control circuitry 604 may call a function to perform a comparison of the values describing the location on the heads up display corresponding to the foreground area of the visual field of the user to values describing the location of the additional content on the heads up display. In some embodiments the values describing the location on the heads up display corresponding to the foreground area of the visual field of the user may be encoded as a primitive data structure, and rather than using a temporary variable, the values describing the location on the heads up display corresponding to the foreground area of the visual field of the user may be directly used in the comparison at line 1409.

At line 1408, control circuitry 604 stores the values describing the location of the additional content on the heads up display into a temporary variable "B." Similar to the values describing the location on the heads up display corresponding to the foreground area of the visual field of the user, in some embodiments the values describing the location of the additional content on the heads up display will be stored as part of a larger data structure or class, and the values describing the location of the additional content on the heads up display may be obtained through accessor methods. In some embodiments the values describing the location of the additional content on the heads up display may be converted from a string or other non-numeric data type into a numeric data type by means of an appropriate hashing algorithm, or the values describing the location of the additional content on the heads up display may be a primitive data structure, and may be directly used in the comparison at line 1409.

At line 1409, control circuitry 604 compares the values describing the location on the heads up display corresponding to the foreground area of the visual field of the user to the values describing the location of the additional content on the heads up display to determine if the location of the additional content on the heads up display is within the location on the heads up display corresponding to a foreground area of the visual field of the user. If values describing a location on the heads up display describe the top, bottom, right and left boundaries of the location on the heads up display, and if values increase as boundaries proceed from left to right and bottom to top, determining whether the location of the additional content on the heads up display is within the location on the heads up display corresponding to the foreground area of the visual field of the user is achieved as follows. The value describing the right boundary of the location of the additional content on the heads up display is subtracted from the value describing the right boundary of the location on the heads up display corresponding to the foreground area of the visual field of the user. The value describing the top boundary of the location of the additional content on the heads up display is subtracted from the value describing the top boundary of the location on the heads up display corresponding to the foreground area of the visual field of the user. The value describing the left boundary of the location on the heads up display corresponding to the foreground area of the visual field of the user is subtracted from the value describing the left boundary of the location of the additional content on the heads up display. The value describing the bottom boundary of the location on the heads up display corresponding to the foreground area of the visual field of the user is subtracted from the value describing the bottom boundary of the location of the additional content on the heads up display. The value of each difference is calculated, and value of each difference is compared to a predetermined tolerance level. In some embodiments the tolerance level may be a set percentage of either the values describing the location on the heads up display corresponding to the foreground area of the visual field of the user or the values describing the location of the additional content on the heads up display. In some embodiments the tolerance level may be a fixed number. For example, setting the tolerance level to a set multiple of machine epsilon may allow for the algorithm to account for small rounding errors that may result from the use of floating point arithmetic. In some embodiments the tolerance level may be set to zero.

At line 1410, control circuitry 604 executes a subroutine to change the location of the additional content on the heads up display if any of the values of each difference are greater than the predetermined tolerance level. In some embodiments this may be achieved by processing circuitry 606 sending the appropriate signals to display 612.

At line 1412, control circuitry 604 runs a termination subroutine after the algorithm has performed its function. For example, in some embodiments control circuitry 604 may destruct variables, perform garbage collection, free memory or clear the cache of processing circuitry 606.

It will be evident to one skilled in the art that process 1400 described by the pseudocode in FIG. 16 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after certain lines to speed operation, or the conditional statements may be replaced with a case-switch.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

I claim:

1. A method comprising:
controlling a heads up display to display first content in a first portion of a visual field of the heads up display;
controlling the heads up display to display second content in a second portion of the visual field of the heads up display;
detecting, based on a signal from a motion sensor, movement of a user of the heads up display;
in response to detecting the movement, modifying display of the first content in the first portion of the heads up display to include the second content in the first portion of the visual field of the heads up display;
receiving an input from the user; and
in response to the input, removing the second content from the heads up display.

2. The method of claim 1, wherein:
the first portion of the visual field of the heads up display corresponds to a non-peripheral area of a visual field of the user; and
the second portion of the visual field of the heads up display corresponds to a peripheral area of the visual field of the user.

3. The method of claim 1, wherein controlling the heads up display to display the second content comprises generating for display the second content as a picture-in-picture.

4. The method of claim 1, wherein detecting the movement includes detecting a head movement of the user.

5. The method of claim 1, wherein detecting the movement includes detecting a full body movement of the user.

6. The method of claim 5, wherein detecting the full body movement of the user comprises detecting a first footstep taken by the user.

7. The method of claim 6, further comprising:
detecting a second footstep taken by the user; and
in response to the detecting of the second footstep, performing at least one of enlarging the second content, decreasing an opacity of the first content or increasing an opacity of the second content.

8. The method of claim 1, wherein the motion sensor comprises one of a capacitive motion sensor, a piezoelectric motion sensor, or a micro-electromechanical motion sensor.

9. The method of claim 1, wherein:
the first content relates to media being consumed by the user; and
the second content relates to a physical environment surrounding the user.

10. A method comprising:
controlling a heads up display to display first content in a first portion of a visual field of the heads up display;
controlling the heads up display to display second content in a second portion of the visual field of the heads up display;
detecting, based on a signal from a motion sensor, movement of a user of the heads up display;
in response to detecting the movement, modifying display of the first content in the first portion of the heads up display to include the second content in the first portion of the visual field of the heads up display;
detecting that the user is substantially stationary; and
in response to the detecting that the user is substantially stationary, controlling the heads up display to display the second content in a third portion of the visual field of the heads up display that is not in a foreground area of a visual field of the user.

11. A system comprising:
a motion sensor; and
control circuitry configured to:
control a heads up display to display first content in a first portion of a visual field of the heads up display;
control the heads up display to display second content in a second portion of the visual field of the heads up display;
detect, based on a signal from the motion sensor, movement of a user of the heads up display;
in response to detecting the movement, modify display of the first content in the first portion of the heads up display to include the second content in the first portion of the visual field of the heads up display;
receive an input from the user; and
in response to the input, remove the second content from the heads up display.

12. The system of claim 11, wherein:
the first portion of the visual field of the heads up display corresponds to a non-peripheral area of a visual field of the user; and
the second portion of the visual field of the heads up display corresponds to a peripheral area of the visual field of the user.

13. The system of claim 11, wherein the control circuitry configured to control the heads up display to display the second content is further configured to generate for display the second content as a picture-in-picture.

14. The system of claim 11, wherein the control circuitry configured to detect the movement is configured to detect a head movement of the user.

15. The system of claim 11, wherein the control circuitry configured to detect the movement is configured to detect a full body movement of the user.

16. The system of claim 15, wherein the control circuitry configured to detect the full body movement of the user is further configured to detect a first footstep taken by the user.

17. The system of claim 16, wherein the control circuitry is further configured to:
detect a second footstep taken by the user; and in response to the detecting of the second footstep, perform at least one of enlarging the second content, decreasing an opacity of the first content, or increasing an opacity of the second content.

18. The system of claim 11, wherein the control circuitry is further configured to:

detect that the user is substantially stationary; and in response to the detecting that the user is substantially stationary, control the heads up display to display the second content in a third portion of the visual field of the heads up display that is not in a foreground area of a visual field of the user.

19. The system of claim 11, wherein the motion sensor comprises one of a capacitive motion sensor, a piezoelectric motion sensor, or a micro-electromechanical motion sensor.

20. The system of claim 11, wherein:

the first content relates to media being consumed by the user; and the second content relates to a physical environment surrounding the user.

\* \* \* \* \*